United States Patent
He et al.

(10) Patent No.: US 12,200,644 B2
(45) Date of Patent: Jan. 14, 2025

(54) SYNCHRONIZATION SIGNAL AND PHYSICAL BROADCAST CHANNEL BLOCK TRANSMISSION IN WIRELESS COMMUNICATION

(71) Applicant: Apple Inc., Cupertino, CA (US)

(72) Inventors: Hong He, Cupertino, CA (US); Chunhai Yao, Beijing (CN); Chunxuan Ye, San Diego, CA (US); Dawei Zhang, Saratoga, CA (US); Haitong Sun, Irvine, CA (US); Oghenekome Oteri, San Diego, CA (US); Seyed Ali Akbar Fakoorian, San Diego, CA (US); Wei Zeng, San Diego, CA (US); Weidong Yang, San Diego, CA (US); Huaning Niu, San Jose, CA (US); Yushu Zhang, Beijing (CN); Jie Cui, San Jose, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 17/441,891

(22) PCT Filed: Apr. 6, 2021

(86) PCT No.: PCT/CN2021/085541
§ 371 (c)(1),
(2) Date: Sep. 22, 2021

(87) PCT Pub. No.: WO2022/213240
PCT Pub. Date: Oct. 13, 2022

(65) Prior Publication Data
US 2023/0276385 A1     Aug. 31, 2023

(51) Int. Cl.
*H04W 56/00* (2009.01)
*H04L 27/26* (2006.01)
*H04W 24/08* (2009.01)

(52) U.S. Cl.
CPC ... *H04W 56/0015* (2013.01); *H04L 27/26025* (2021.01); *H04W 24/08* (2013.01)

(58) Field of Classification Search
CPC .............. H04W 56/00; H04W 56/001; H04W 56/0015; H04W 24/08; H04L 27/26; H04L 27/2601; H04L 27/2602; H04L 27/26025
See application file for complete search history.

(56) References Cited

U.S. PATENT DOCUMENTS

| 10,772,054 | B2 * | 9/2020 | Jung | H04J 11/0069 |
| 10,826,758 | B2 * | 11/2020 | Huang | H04B 7/088 |

(Continued)

FOREIGN PATENT DOCUMENTS

| CA | 3029821 A1 * | 12/2018 | ........... H04B 7/2656 |
| CA | 3130233 A1 * | 8/2020 | ........... H04L 5/0048 |

(Continued)

OTHER PUBLICATIONS

International Search Report and Written Opinion for PCT Patent Application No. PCT/CN2021/085541; 12 pages; Jan. 6, 2022.

(Continued)

*Primary Examiner* — Kevin D Mew
(74) *Attorney, Agent, or Firm* — Kowert, Hood, Munyon, Rankin & Goetzel, P.C.

(57) ABSTRACT

A user equipment (UE) may monitor a downlink frequency position to detect a synchronization block (SSB) from a cellular base station. When monitoring the downlink frequency position, the UE may be configured to use at least one step size in calculating a SSB frequency position. The (Continued)

UE may determine a subcarrier spacing (SCS) used by the cellular base station in response to monitoring the downlink frequency position, and the subcarrier spacing for one or more SSB transmissions may be determined at least in part based on the step size used in calculating the SSB frequency position. The UE may then utilize the determined subcarrier spacing of the one or more SSB transmissions in communicating with the cellular base station.

20 Claims, 27 Drawing Sheets

(56) References Cited

U.S. PATENT DOCUMENTS

| | | | |
|---|---|---|---|
| 10,879,990 B1 * | 12/2020 | Zhu | H04B 17/309 |
| 2019/0110287 A1 * | 4/2019 | Lee | H04L 5/0094 |
| 2019/0159148 A1 | 5/2019 | Jung et al. | |
| 2019/0200307 A1 | 6/2019 | Si et al. | |
| 2019/0306832 A1 | 10/2019 | Si | |
| 2019/0393980 A1 * | 12/2019 | Lin | H04L 27/2607 |
| 2020/0154341 A1 * | 5/2020 | Sun | H04W 48/12 |
| 2020/0205102 A1 * | 6/2020 | Islam | H04W 24/10 |
| 2020/0383167 A1 * | 12/2020 | Sengupta | H04W 76/19 |
| 2021/0021363 A1 * | 1/2021 | Lee | H04W 24/10 |
| 2021/0067298 A1 | 3/2021 | Si et al. | |

FOREIGN PATENT DOCUMENTS

| | | | | |
|---|---|---|---|---|
| EP | 3790333 A1 * | 3/2021 | | H04L 5/0094 |
| WO | WO-2019049096 A1 * | 3/2019 | | H04B 7/0617 |
| WO | WO-2019067925 A1 * | 4/2019 | | H04B 7/0413 |
| WO | WO-2019095916 A1 * | 5/2019 | | H04J 11/00 |
| WO | WO-2019102064 A1 * | 5/2019 | | H04B 17/318 |
| WO | WO-2019160331 A1 * | 8/2019 | | H04W 56/001 |
| WO | WO-2020146536 A1 * | 7/2020 | | H04L 1/0003 |

OTHER PUBLICATIONS

Ericsson "Frequency location of SSBs for IAB node discovery and Measurement"; 3GPP TSG-RAN WG1 #97 R1-1906590; Reno, USA; 4 pages; May 17, 2019.

Office Action for JP Patent Application No. 2022-520812; Jun. 8, 2023.

VIVO "Discussions on initial access aspects for NR operation from 52.6GHz to 71GHz"; 3GPP TSG RAN WG1#104-e R1-2100429; Jan. 2021.

Qualcomm Inc. "Initial access aspects for NR to support operation between 52.6 GHz and 71 GHz"; 3GPP TSG RAN WG1 #104-e R1-2101453; Jan. 2021.

CATT "Initial access aspects for up to 71 GHz operation"; 3GPP TSG RAN WG1 #104-e R1-2100370; Jan. 2021.

Zte et al. "Discussion on the initial access aspects for 52.6 to 71 GHz"; 3GPP TSG RAN WG1 #104-e R1-210073; Jan. 2021.

* cited by examiner

One example of modified SIB4 to explicitly indicate the optional SCSs of SSB

SIB4:

| Frequency List | SSB SCS |
|---|---|
| ARFCN1 | 480 |
| ARFCN2 | 120 |
| ARFCN3 | 960 |
| ARFCN4 | 960 |
| ARFCN5 | 480 |
| ARFCN6 | 120 |
| ARFCN7 | 120 |
| ARFCN8 | 960 |

UE does not perform cell search on these ARFCN (GSCN) if it does not support optional SCSs for SSB

```
SIB4 ::=SEQUENCE {
interFreqCarrierFreqList InterFreqCarrierFreqList,
]}
InterFreqCarrierFreqInfo ::= SEQUENCE {
dl-CarrierFreq    ARFCN-ValueNR,
...
ssbSubcarrierSpacing    SubcarrierSpacing,
...}
SubcarrierSpacing ::=
ENUMERATED {kHz15, kHz30, kHz60, kHz120, kHz240,
kHz480, kHz960, spare1}
```

FIG. 12

Transmit a plurality of synchronization signal (SS) blocks according to a periodic pattern
1402

Include SS bursts each including SS blocks (SSBs) in a subset of periods of the periodic pattern are transmitted
1402a Include at least one symbol reserved between two consecutive SSBs for beam switching in each SS burst
1402b

FIG. 14

*1-bit SSB pattern index is signaled using 2nd DMRS symbol of PBCH transmission*

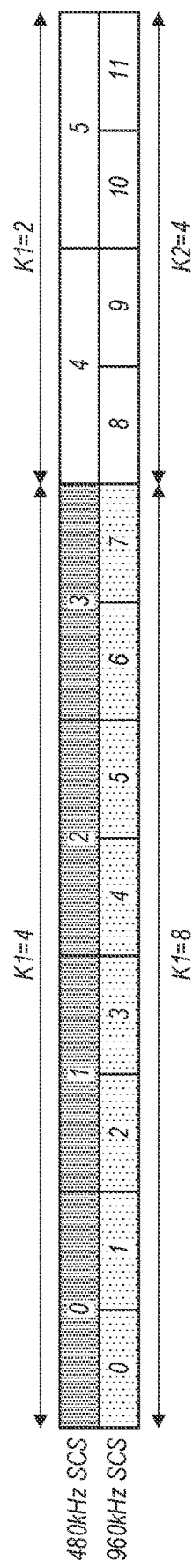
FIG. 19A
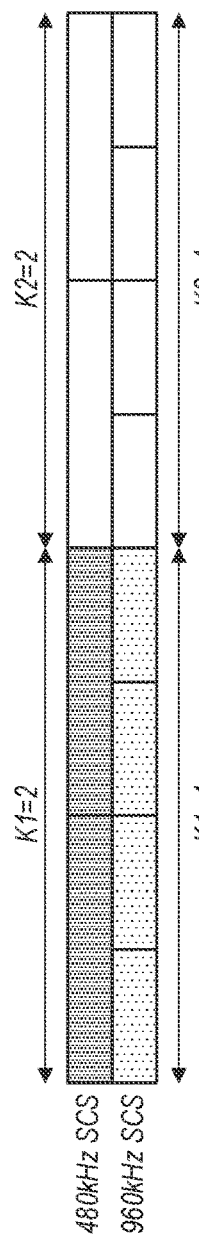 
FIG. 19B

```
┌─────────────────────────────────────────────────────────────┐
│  Transmit a plurality of synchronization signal blocks       │
│  (SSBs) to one or more user equipments (UEs)                 │
│                        2002                                  │
│                                                              │
│   ┌───────────────────────────────────────────────────────┐  │
│   │  Include values in the SSBs corresponding indicating  │  │
│   │  the presence of a discovery burst transmission       │  │
│   │  window (DBTW)                                        │  │
│   │                    2002a                              │  │
│   └───────────────────────────────────────────────────────┘  │
└─────────────────────────────────────────────────────────────┘
                              │
                              ▼
┌─────────────────────────────────────────────────────────────┐
│             Transmit additional SSBs in the DBTW             │
│                            2004                              │
└─────────────────────────────────────────────────────────────┘
```

*FIG. 20*

DBTW Presence Indication by re-purposing existing fields of PBCH payload

```
MIB::= SEQUENCE {
    systemFrameNumbersubCarrierSpacingCommon  BIT STRIBG (SIZE (6)),
    SubCarrierSpacingCommon                    ENUMERATED {scs15or60, scs30or120},
    ssb-SubcarrierOffset                       INTEGER (0..15),
    Dmrs-TypeA-Position                        ENUMERATED {pos2, pos3},
    Pdcch-ConfigSIB1                           PDCCH-ConfigSIB1,
    cellBarred                                 ENUMERATED {barred, notBarred},
    intraFreqReselection                       ENUMERATED {allowed, notAllowed},
    DBTW                                       ENUMERATED {enabled},
}
```

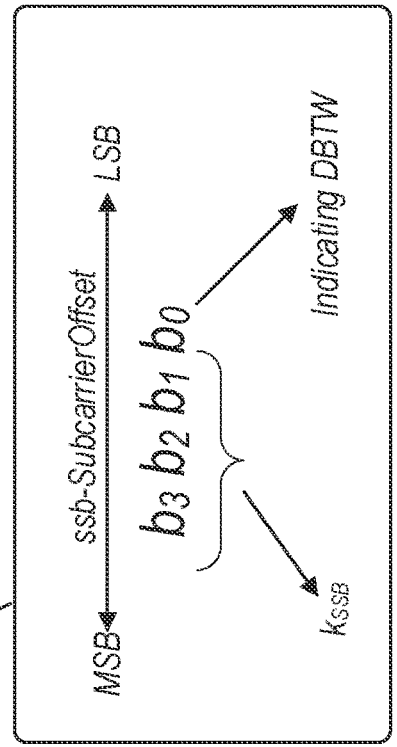

FIG. 23

*DBTW presence is signaled using 2nd DMRS symbol of PBCH transmission*

| ARFCN | <Presence of DBTW, Q> |
|---|---|
| #1 | <YES, 2> |
| #2 | <YES, 4> |
| #3 | <YES, 8> |
| #4 | NO |
| #5 | NO |
| #6 | NO |
| #7 | NO |
| #8 | NO |

SYNCHRONIZATION SIGNAL AND PHYSICAL BROADCAST CHANNEL BLOCK TRANSMISSION IN WIRELESS COMMUNICATION

Priority Claim Information

This application is a U.S. National Stage application of International Application No. PCT/CN2021/085541, filed Apr. 6, 2021, titled "Synchronization Signal and Physical Broadcast Channel Block Transmission in Wireless Communication", which is hereby incorporated by reference in its entirety.

FIELD

The invention relates to wireless communications, and more particularly to apparatuses, systems, and methods for synchronization signal and physical broadcast channel block transmission in wireless communication.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies. Accordingly, improvements in the field in support of such development and design are desired.

SUMMARY

Embodiments relate to wireless communications, and more particularly to apparatuses, systems, and methods for synchronization signal and physical broadcast channel block transmission in wireless communication.

For example, a user equipment (UE) may monitor a downlink frequency position to detect a synchronization block (SSB) from a cellular base station. When monitoring the downlink frequency position the UE may be configured to use at least one step size in calculating a SSB frequency position. The UE may determine a subcarrier spacing (SCS) used by the cellular base station in response to monitoring the downlink frequency position, and the subcarrier spacing for one or more SSB transmissions may be determined at least in part based on the step size used in calculating the SSB frequency position. The UE may then utilize the determined subcarrier spacing of the one or more SSB transmissions in communicating with the cellular base station.

In some embodiments, in monitoring the downlink frequency position, the UE may be configured to use a plurality of step sizes in calculating SSB frequency position. The UE may use a first step size to calculate a frequency position for a first set of SSB subcarrier spacings and use a second step size to calculate a frequency position for a second set of SSB subcarrier spacings. Additionally, in monitoring the downlink frequency position the UE may be configured to use a first step size to calculate a frequency position for a first set of SSB sub-carrier spacings that are mandatorily supported by one or more UEs per a cellular communication standard and use a second step size to calculate a frequency position for a second set of SSB sub-carrier spacings that are optionally supported by one or more UEs per the cellular communication standard.

Additionally or alternatively, in monitoring the downlink frequency position the UE may be configured to use a respective different second step size for each of a plurality of ones of the second set of SSB subcarrier spacings that are optionally supported by one or more UEs per the cellular communication standard. The second set of SSB sub-carrier spacings may include 480 kHz and 960 kHz, among others. Furthermore, in monitoring the downlink frequency position the UE may use a single step size in calculating frequency position for all possible sub-carrier spacings of the SSB, including SSB sub-carrier spacings that are mandatorily supported by one or more UEs per a cellular communication standard and SSB sub-carrier spacings that are optionally supported by one or more UEs per the cellular communication standard, according.

In other embodiments, a cellular base station may comprise an antenna, a radio operably coupled to the antenna, and a processing element operably coupled to the radio. The cellular base station may be configured to transmit, as part of a physical broadcast channel (PBCH) payload, synchronization signaling according to a periodic pattern, wherein, in at least a subset of periods of the periodic pattern, one or more SS bursts each comprising a plurality of SS blocks (SSBs) are transmitted, wherein each SS burst comprises at least one symbol reserved between two consecutive SSBs for beam switching.

In other embodiments, a user equipment (UE) may comprise an antenna, a radio operably coupled to the antenna, and a processing element operably coupled to the radio. The UE may be configured to monitor a downlink frequency position to detect one or more synchronization signal blocks (SSBs) as part of a physical broadcast channel (PBCH) payload transmission from a cellular base station, wherein the one or more SSBs comprise information usable by the UE in determining a presence or absence of a discovery burst transmission window (DBTW).

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 12 illustrates a modified System Information Block 4 (SIB4) indicating optional SCSs of SSBs, according to some embodiments.

FIG. 14 is a flow diagram illustrating a method of indicating beam switching between candidate SSBs, according to some embodiments.

FIGS. 19A and 19B illustrate two examples for time-aligned SSBTW patterns for new 480 kHz and 960 kHz SCSs, according to some embodiments.

FIG. 20 is a flow diagram illustrating a method of indicating DPTW presence in candidate SCSs, according to some embodiments.

FIG. 23 illustrates an example method of re-purposing existing fields in physical broadcast channel (PBCH) payloads as a means of indicating DBTW presence, according to some embodiments.

FIG. 25 illustrates the presence of DBTW and an associated Q value in a number of absolute radio frequency channels (ARFCNs) as indicated by SIB4, according to some embodiments.

Figure 1A:
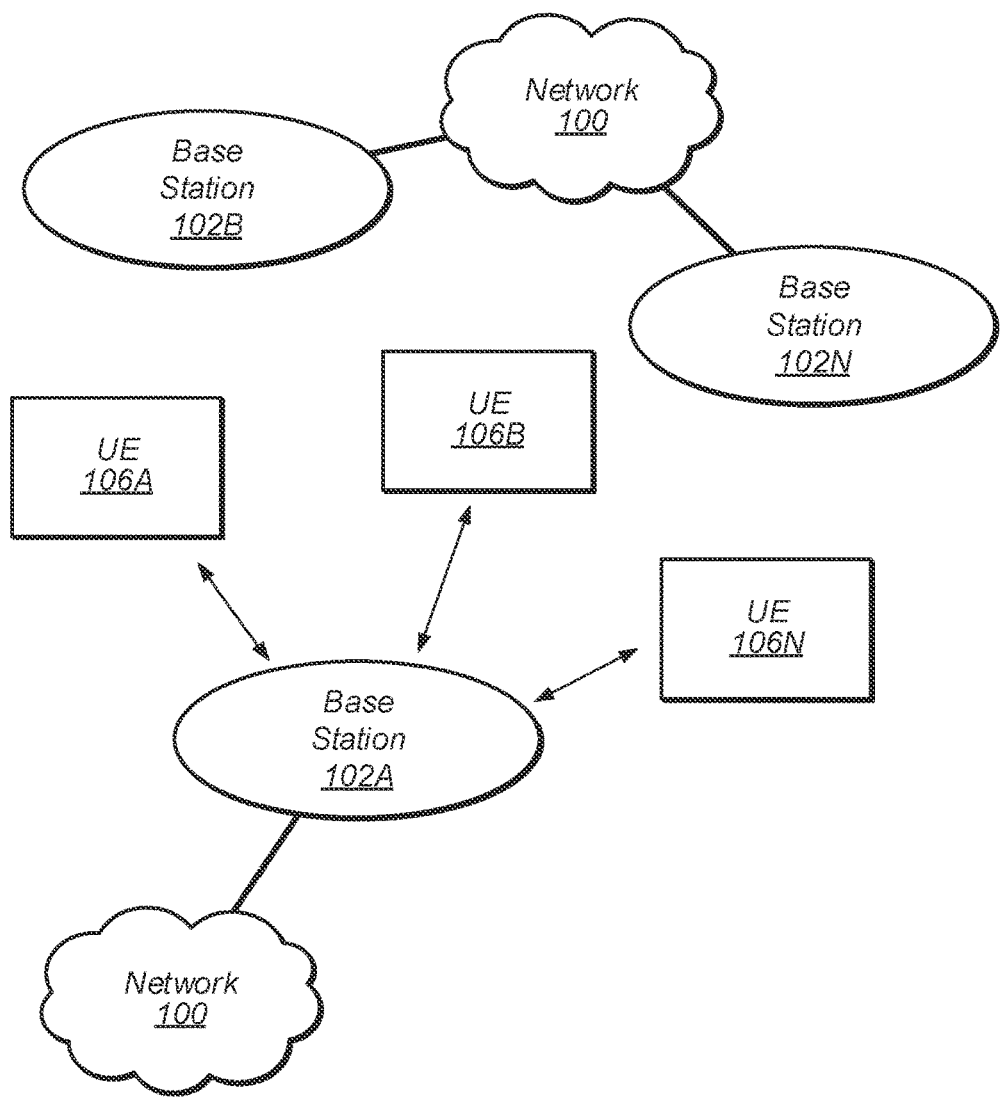
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification

RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
LBT: Listen Before Talk
SCS: Subcarrier Spacing
SSB: Synchronization Signal Block
RRM: Radio Resource Management
RLM: Radio Link Management
QCL: Quasi-Colocated
SMTC: SSB-Based RRM Measurement Timing Configuration
SSBTW: Synchronization Signal Block Transmission Window
DBTW: Discovery Burst Transmission Window
DRS: Discovery Reference Signal
EPC: Evolved Packet Core
DMRS: Demodulation Reference Signal
ARFCN: Absolute Radio Frequency Channel
PSS: Primary Synchronization Signal
SSS: Secondary Synchronization Signal
FR: Frequency Range
CGI: Cell Global Identity
RB: Resource Block
BPSK: Binary Phase Shift Keying
QPSK: Quadrature Phase Shift Keying Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
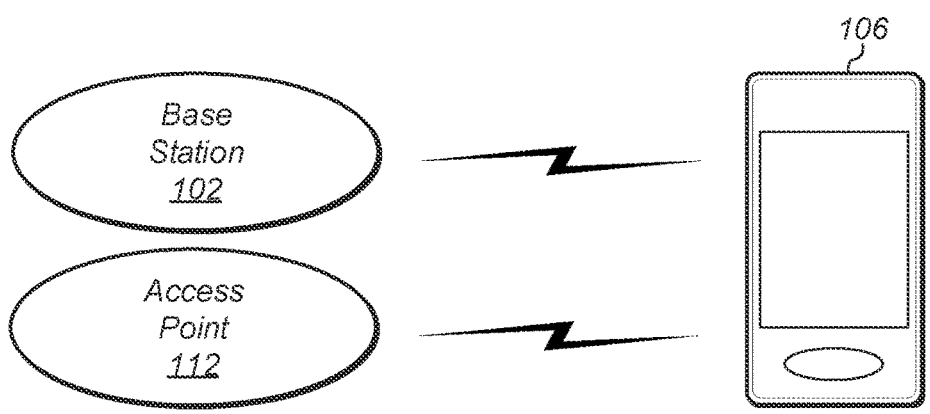
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
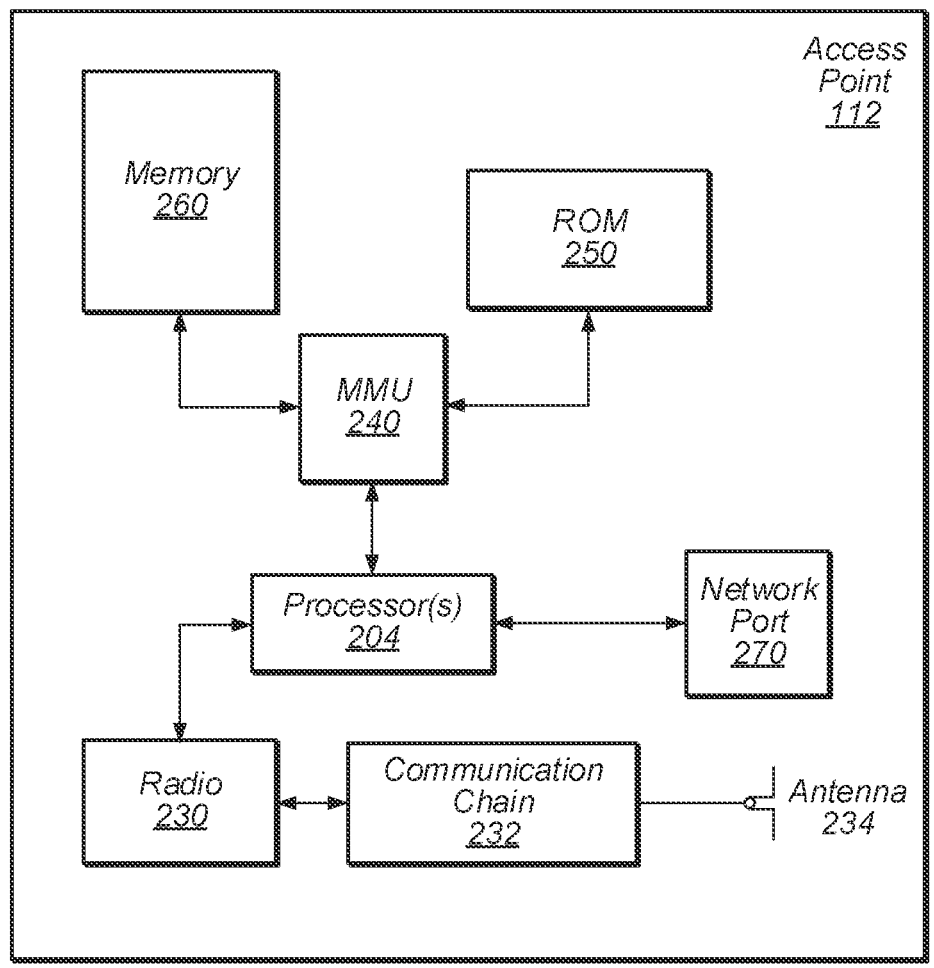
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
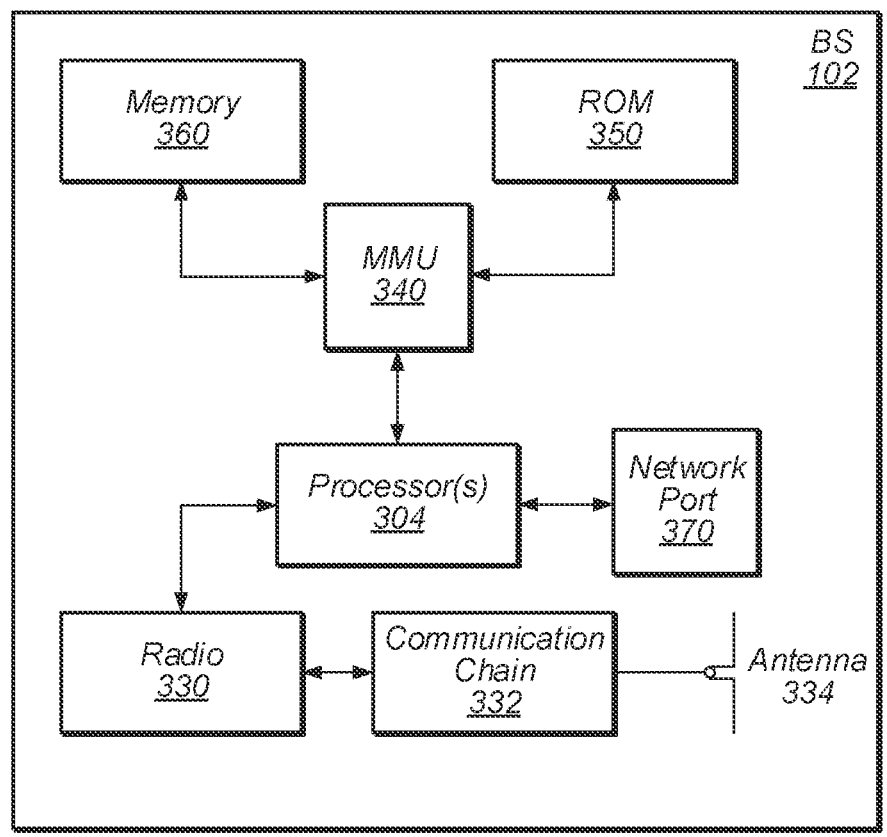
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
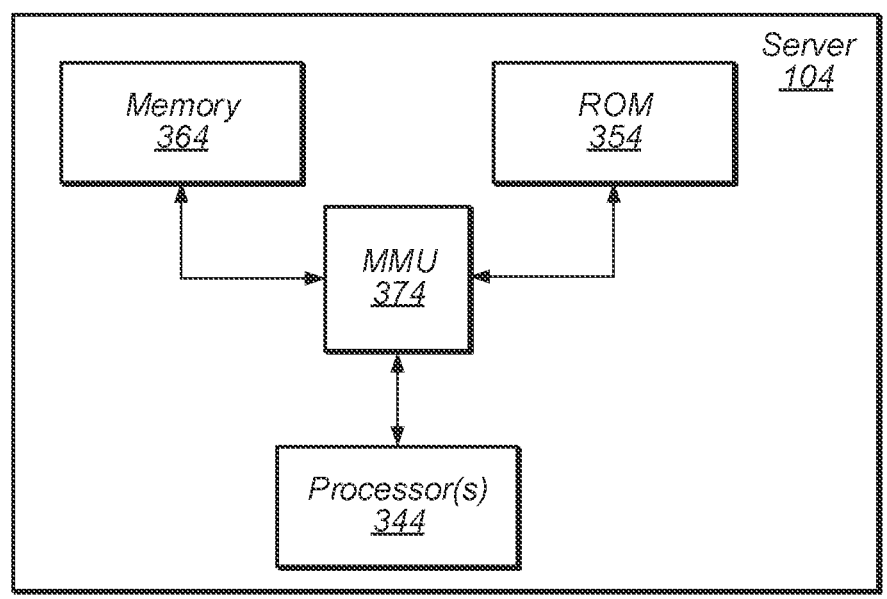
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
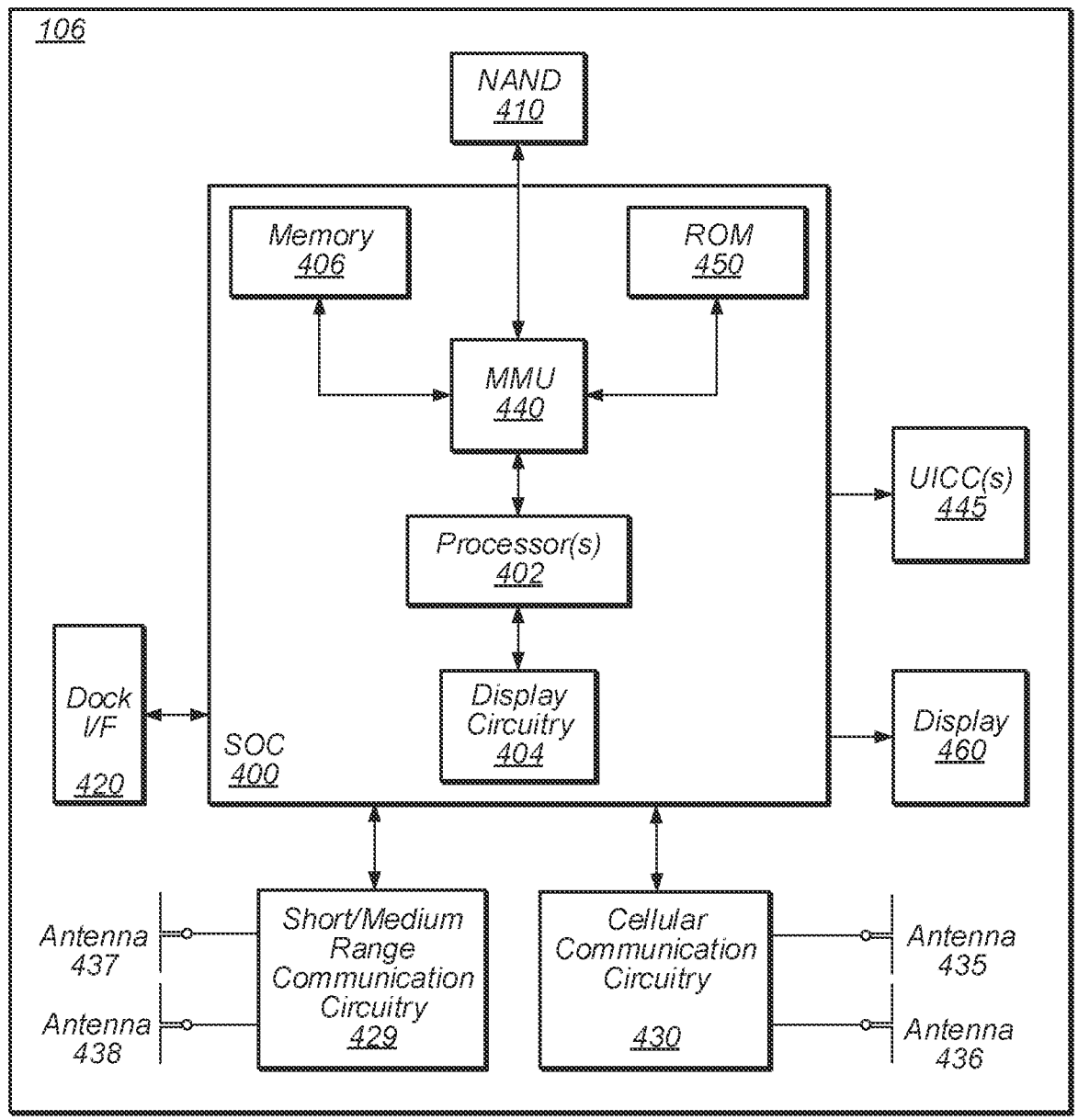
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMS 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMS, two removable SIMs, or a combination of one embedded SIMs and one removable SIMS. Various other SIM configurations are also contemplated.

As noted above, in some embodiments, the UE 106 may include two or more SIMs. The inclusion of two or more SIMS in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 comprises two SIMS, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
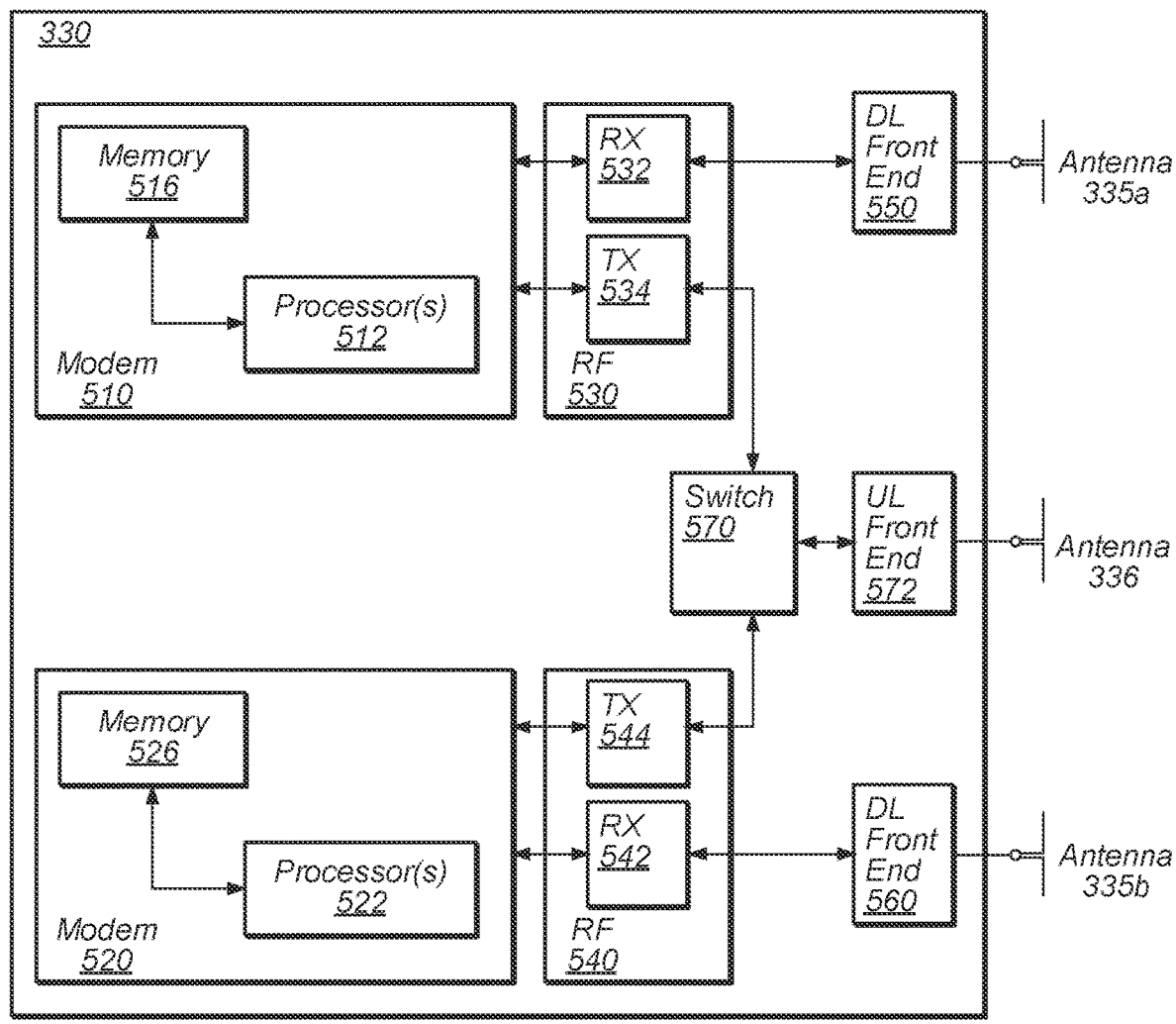
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
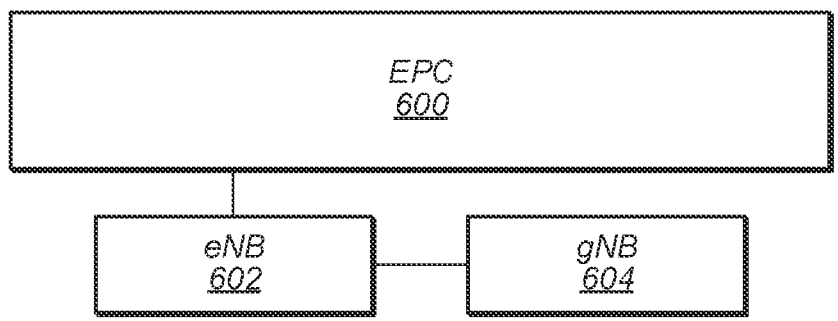
FIG. 6A illustrates an example of connections between an evolved packet core (EPC) network, an LTE base station (eNB), and a 5G NR base station (gNB).
Figure 6B:
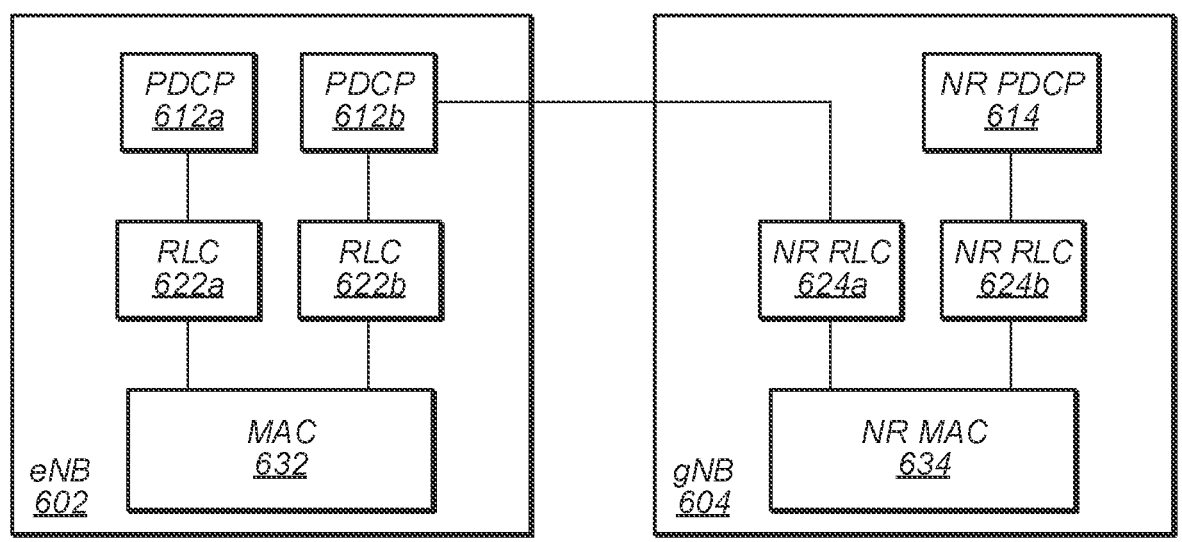
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Synchronization Signal Block Index Signaling

Synchronization signals may commonly be used in a cellular communication system to assist wireless devices to detect and acquire system information for cells of the cellular communication system. In other words, synchronization signals may be transmitted by a base station in a cellular network to allow UEs to detect and use information in the synchronization signal(s) to properly communicate with the base station. There may be multiple types of synchronization signals, which may include primary synchronization signals (PSS), secondary synchronization signals (SSS), a physical broadcast channel (PBCH), and/or any of various other portions, according to various embodiments. The synchronization signals may provide/facilitate one or more aspects of cell detection/access, such as timing synchronization (e.g., symbol, time slot, subframe, and/or radio frame level timing), physical cell identifier (cell ID), and/or part or all of the system information (e.g., a master information block (MIB), one or more system information blocks (SIBs), etc.) for the cell, among various possibilities.

The synchronization signals may be provided together or at different times, and may be transmitted according to any of various transmission patterns, as desired. As one possibility (e.g., according to 3GPP LTE), the PSS, SSS, and PBCH may be provided at separate periodic intervals. As another possibility (e.g., according to 3GPP NR), the PSS, SSS, and PBCH may be provided together (e.g., using consecutive symbols) in each of multiple synchronization signal blocks that are transmitted according to a desired transmission pattern. According to some embodiments, each periodic pattern of synchronization signals provided by a cell may be referred to as a synchronization signal burst set.

Methods and Apparatus for Synchronization Signal/PBCH block Transmission in Wireless Communication Extending current NR operation to 71 GHz has been the topic of recent studies and work item discussions. In particular, it may be desirable to modify current SSB transmissions to accommodate this extension. For example, extending operations to the 71 GHz frequency range may require support of 120 kHz sub-carrier spacing (SCS) for synchronization signal blocks (SSBs) and 120 kHz SCS for initial access related signals/channels in an initial bandwidth part (BWP). Additionally, various other higher frequency SCSs (e.g., 240 kHz, 480 kHz, 960 kHz) may also be utilized for SSB as well as additional SCSs (e.g., 480 kHz, 960 kHz) for initial access related signals/channels in initial BWP or other cases other than initial access.

Moreover, support of 480 kHz and 960 kHz SCSs for initial access may be desired in order to reduce power consumption at the UE side. More specifically, due to the fact that these SCSs are typically an optional feature and therefore the UE may not support these SCSs, the UE may waste valuable battery life performing cell searching operations on ultimately unsupported SCSs. Accordingly, the embodiments described below seek to provide solutions for assisting the UE such that the UE is able to identify the SSBs with optional SCSs when performing cell searching or other functions.

Figure 7:
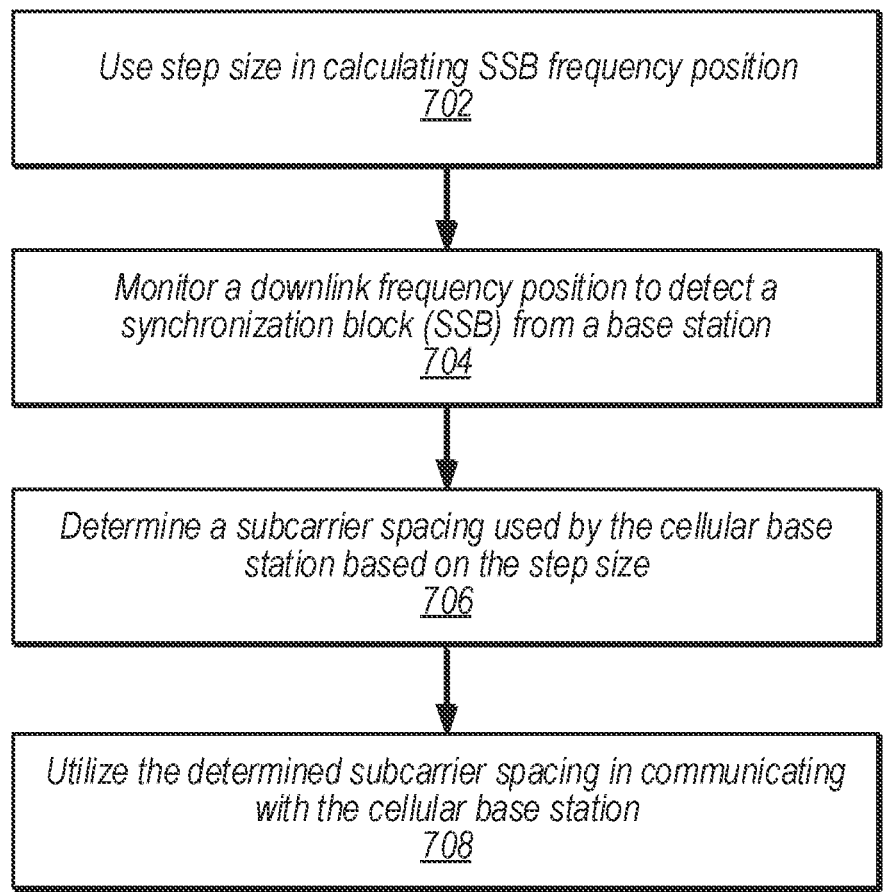
FIG. 7 is a flow diagram illustrating an example method of SSB-SCS determination during initial access, according to some embodiments.

FIG. 7—Method of Determining Subcarrier Spacing by Calculating Frequency Position Through Use of Frequency Step Sizes FIG. 7 illustrates a method of determining subcarrier spacing by calculating frequency position through use of frequency step sizes, according to some embodiments.

In 702, the UE may use at least one step size in calculating a SSB frequency position. In other words, the UE may use at least one step size in determining the frequency position at which the UE searches or monitors for an SSB. For example, the UE may utilize different step sizes in a frequency band (e.g., $\Delta_i$) corresponding to different SCSs which may be mandatorily supported (e.g., 120 kHz SCS) or optionally supported (e.g., 240 kHz, 480 kHz, 960 kHz SCSs) to calculate the SSB frequency position. Additionally, or alternatively, the step size may be characterized by the difference of the minimum channel bandwidth and the SSB bandwidth of the SCS, a single step size may be used for all of the SSB SCSs (mandatory and optional) or only the optional SSB SCSs, according to some embodiments. Furthermore, separate step sizes may be used for different optional SSB SCSs or GSCN indices may be used to calculate the SSB frequency position. In other words, by utilizing a frequency step size (e.g., synchronization raster with certain frequency spacing (e.g., step size)), the raster may be used to indicate frequency positions of the synchronization blocks that can be used by the UE for system acquisition when explicit signaling of the synchronization block positions are not present.

In 704, based on the calculated SSB frequency position determined in 702, the UE may monitor a downlink frequency position to detect a synchronization block (SSB) from a cellular base station. For example, the UE may be capable of operating in a frequency band above 52.6 GHz in an unlicensed spectrum and may further be configured to support higher frequency sub-carrier spacings (e.g., 240 kHz, 480 kHz, 960 kHz). Accordingly the UE may perform cell searching operations for initial access and potentially receive SSBs from the network (e.g., a base station) with a corresponding SCS. In other words, in an effort to communicate with the network and more specifically a certain cell of the network, the UE may monitor a downlink frequency position for said SSBs with certain SCSs.

Next, in 706, through monitoring the DL frequency position, the UE may determine a subcarrier spacing used by the cellular base station based at least in part on the step size. For example, as described above with regard to 704, the UE may use a particular step size corresponding to a particular SCS to calculate the SSB frequency position and may further determine the subcarrier spacing associated with the calculated SSB frequency position. Additionally, or alternatively, the UE may use a step size characterized by a minimum channel bandwidth and an SSB bandwidth of a known SCS (e.g., an expected or searched for SCS) to calculate the SSB frequency position and ultimately confirm or determine the subcarrier spacing that was expected based on the selected step size. In other words, by calculating the SSB frequency position (based on a step size) and knowing the subcarrier spacings and periodicities of mandatory and/or optional SCSs (e.g., 120 kHz, 240 kHz, 480 kHz, and 960 kHz), the UE may utilize a synchronization raster based on the calculated SSB frequency position to confirm or determine the subcarrier spacing associated with the received SSB.

In 708, the UE may utilize the determined subcarrier spacing in communicating with the cellular base station. In other words, having determined the subcarrier spacing associated with the SSBs (based on the calculated SSB frequency position through utilizing a particular step size), the UE may configure its future transmissions to support said subcarrier spacing and possibly attempt to communicate with the network (e.g., a base station) by performing a cell search and cell attaching procedure.

In some embodiments, at 702 the UE may use any of various combinations of one or more step sizes to calculate frequency positions for use in monitoring the frequency position for SSBs. For example, the UE may be configured to use a plurality of step sizes in calculating the SSB frequency position. The UE may use a first step size to calculate a frequency position for a first set of SSB subcarrier spacings and use a second step size to calculate a frequency position for a second set of SSB subcarrier spacings. Additionally, in monitoring the downlink frequency position the UE may be configured to use a first step size to calculate a frequency position for a first set of SSB sub-carrier spacings that are mandatory per a cellular communication standard and use a second step size to calculate a frequency position for a second set of SSB sub-carrier spacings that are optional per the cellular communication standard.

Additionally or alternatively, at 702 the UE may be configured to use a respective different second step size for each of a plurality of ones of the second set of SSB subcarrier spacings that are optional per the cellular communication standard. The second set of SSB sub-carrier spacings may include 480 kHz and 960 kHz, among others. Furthermore, in monitoring the downlink frequency position the UE may use a single step size in calculating frequency position for all possible sub-carrier spacings of the SSB, including SSB sub-carrier spacings that are mandatory per a cellular communication standard and SSB sub-carrier spacings that are optional per the cellular communication standard, according.

FIGS. 8-11—SSB-SCS Determination During Initial Access

A UE may take a variety of approaches in performing an initial access procedure in an NR operating band with at least one optional SCS for SSB. More specifically, the UE may take a variety of approaches for the initial access procedure to determine the SCS (e.g., 480 kHz SCS and 960 kHz SCS) of the SSB associated with a given global synchronization channel number (GSCN) value that the UE may use for system acquisition.

In some embodiments, the UE may utilize different step sizes (e.g., $\Delta_i$) to calculate the SSB frequency position $SS_{REF}$ for mandatory SSB SCSs (e.g., 120 kHz SCS) and optional SSB SCSs (e.g., 480 kHz/960 kHz SCS). For example, $\Delta_0=17.28$ may be used for mandatory SSB SCSs and the step size $\Delta_i$ for an optional SSB SCS i (e.g., i=0, 1 for 480 kHz and 960 kHz SCS, respectively) may be determined based on the minimum channel bandwidth within this frequency range FR3 $B_{CC,min}{}^i$ with SCS i and the SSB bandwidth of this SCS $iB_{SSB}{}^i$. In some embodiments, the step size may be characterized by the difference between the minimum channel bandwidth and the SSB bandwidth of the SCS (e.g., $\Delta_i=B_{CC,min}{}^i-B_{SSB}{}^i$) where $\Delta_1<\Delta_2$.

In some embodiments, a single step size $\Delta$ may be used for all of the optional SSB SCSs. However, in this scenario, the UE may also perform hypothetical detection of a SSB SCS if the UE only supports a subset of the optional SCSs rather than of all of the optional SCSs.

Figure 8:
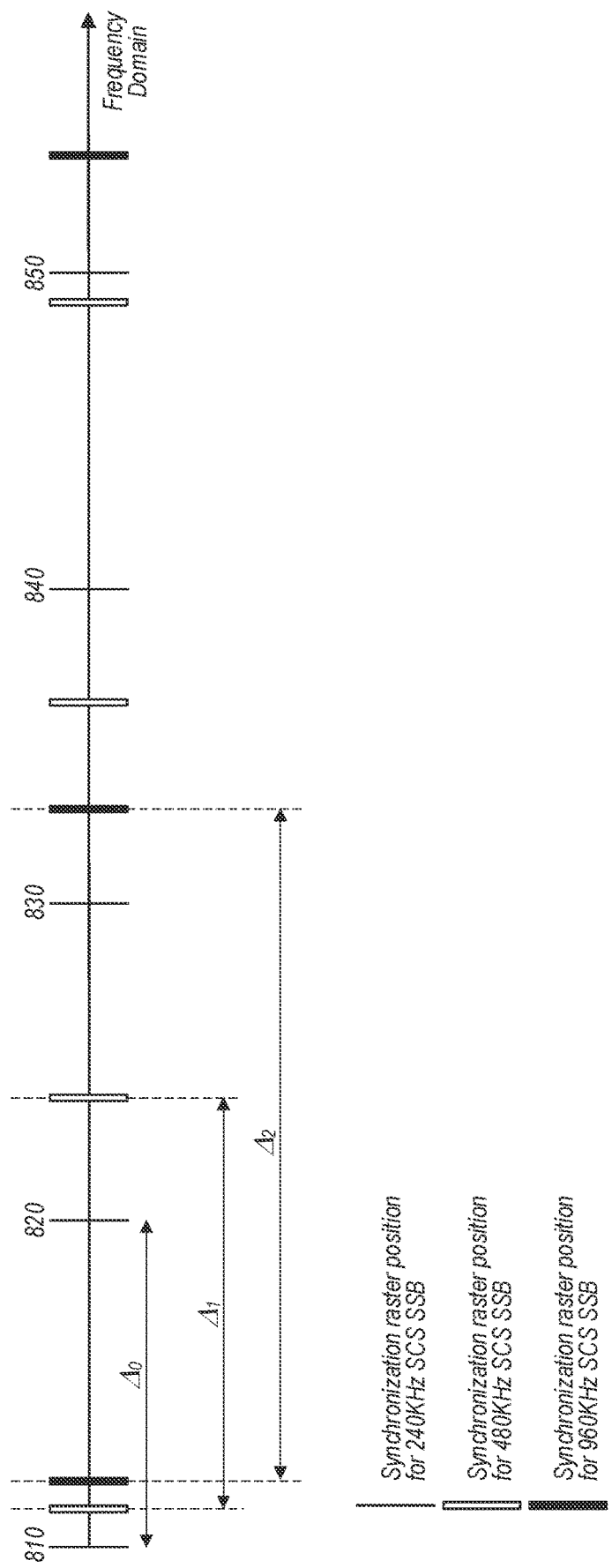
FIG. 8 illustrate an example of SSB-SCS dependent synchronization raster position in the frequency domain, according to some embodiments.

FIG. 8—SSB-SCS Dependent Synchronization Raster Position in Frequency Domain

Separate step sizes $\Delta_i$ may also be used for different optional SSB SCS i. For example, in some embodiments, the number of optional SSB SCSs maybe limited to 1 to minimize the cell search complexity for a UE supporting more than one optional SCS. FIG. 8 illustrates one example of SSB-SCS dependent synchronization raster position in the frequency domain. More specifically, FIG. 8 illustrates the use of separate step sizes $\Delta_i$ for different optional SSB SCS i. For example, in the scenario with three SCSs including a mandatory SCS (e.g., 120 kHz SCS) and two optional SSB SCSs (e.g., 480 kHz/960 kHz SCS), a UE capable of 120 kHz SCS may in some embodiments only perform a cell search on frequency locations 810, 820, 830, 840, and/or 850 of FIG. 8 corresponding to the 120 kHz SCS. In other words, by not performing additional cell search operations on the optional SSB SCSs, the UE may conserve power (e.g., reduce its power consumption).

Figure 9:
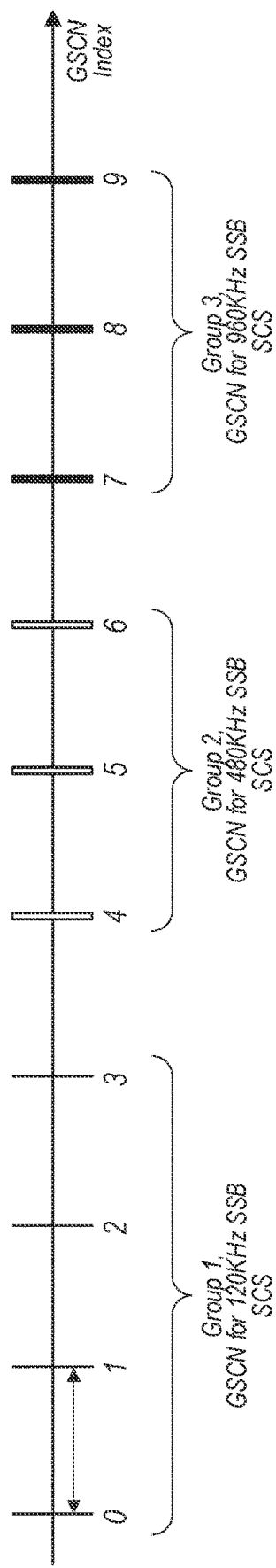
FIG. 9 illustrates an example of non-interleaved global synchronization channel (GSCN) allocation, according to some embodiments.

FIG. 9—Non-Interleaved Global Synchronization Channel (GSCN) Allocation

In some embodiments, a single step size $\Delta$ may be used for all SCSs of a SSB, including both any mandatory SCS(s) (e.g., 120/240 kHz SCS) and any optional SSB SCSs (e.g., 480/960 kHz SCSs). Moreover, in order to reduce the SSB detection complexity, the supported GSCNs may be divided into different groups and the association between SSB SCS(s) and GSCN group(s) may be hard-encoded in the UE or specification.

In some embodiments, the number of GSCNs may be evenly split into N number of groups (e.g., the groups having a one-to-one ratio) wherein the groups are reserved for the supported SCSs within a frequency band. Furthermore, in some embodiments, the number of GSCNs may be allocated in a non-interleaving pattern. For example, FIG. 9 illustrates non-interleaved synchronization raster determination for a frequency band with multiple SSB SCSs. More specifically, FIG. 9 illustrates three groups of GSCNs including both mandatory SCS (e.g., 120 kHz SCS, corresponding to the Group 1 GSCN) and optional SSB SCSs (e.g., 480/960 kHz SCSs corresponding to the Group 2 and Group 3 GSCNs respectively) as well as their respective GSCN indices.

Furthermore, the non-interleaved allocation of the GSCNs may be defined by $G_1=\mathrm{mod}(T,N)$ where T represents a total number of GSCNs within the frequency band and N represents the number of supported SCSs within the band. For example, if $G_1>0$, group n, n=0, 1, . . . , $G_1-1$ may consist of GSCN value indices $n*K_1+k$, k=0, 1 . . . , $K_1-1$ where $$K_1 = \left\lceil \frac{T}{N} \right\rceil.$$

moreover, group n, n=$G_1$, $G_1+1$, . . . , N−1 may consist of GSCN indices $G_1*K_1+(n-G_1)*K_2+k$, k=0, 1, . . . , $k_2-1$ where $$K_2 = \left\lfloor \frac{T}{N} \right\rfloor.$$

FIG. 9 illustrates one example of this non-interleaved GSCN grouping with the assumption that T=10, N=3, $G_1=1$, $K_1=4$, and $K_2=3$. Therefore, as shown in FIG. 9, Group 1 may correspond to GSCN indices 0-3, Group 2 may correspond to GSCN indices 4-6, and Group 3 may correspond to GSCN indices 7-9.

Figure 10:
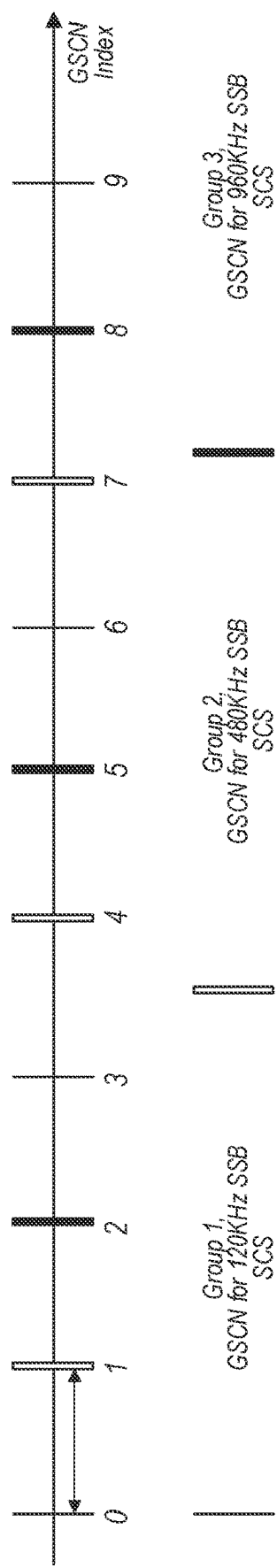
FIG. 10 illustrates an example of interleaved GSCN allocation, according to some embodiments.

FIG. 10—Interleaved GSCN Allocation

As discussed above, a single step size $\Delta$ may be used for all SCSs of a SSB, including both mandatory SCS (e.g., 120/240 kHz SCS) and optional SSB SCSs (e.g., 480/960 kHz SCSs). Moreover, in order to reduce the SSB detection complexity, the supported GSCNs may be divided into different groups and the association between SSB SCS(s) and GSCN group(s) may be hard-encoded in the UE or in a cellular communication specification.

Furthermore, in some embodiments, the number of GSCNs may be allocated in an interleaving pattern. More specifically, the interleaved allocation of the GSCNs may be defined by $G_1=\mathrm{mod}(T, N)$ where T represents a total number of GSCNs within the frequency band and N represents the number of supported SCSs within the band. Accordingly, group n, n=0, 1, . . . , $G_1-1$ may include GSCN value indices $k*N+n$, k=0, 1, . . . , $K_1-1$ where $$K_1 = \left\lceil \frac{T}{N} \right\rceil.$$

Moreover, group n, n=$G_1$, $G_1$+1, ..., N may include GSCN indices k*N+n, k=0, 1, ..., $K_2$−1 where $$K_2 = \left\lceil \frac{T}{N} \right\rceil.$$

FIG. 10 illustrates one example of this non-interleaved GSCN grouping for determining the synchronization raster for different SSB SCSs with the assumption that T=10, N=3, $G_1$=1, $K_1$=4, and $K_2$=3. As shown in FIG. 10, Group 1 may correspond to a GSCN for 120 kHz SSB SCS with indices 0, 3, 6, and 9, Group 2 may correspond to a GSCN for 480 kHz SSB SCS with indices 1, 4, and 7, and Group 3 may correspond to a GSCN for 960 kHz SSB SCS with indices 2, 5, and 8. This interleaved allocation of the GSCNs may be preferable to the previously described GSCN allocation techniques as it may allow for increased number of component carriers (CCs) to be utilized with larger SCSs (e.g., 480 kHz and 960 kHz). Accordingly, it may be more difficult than the previous non-interleaved examples as the GSCN gap may be defined using the minimum bandwidth (BW) for the smallest SCS. (e.g., 240 kHz SCS).

Figure 11:
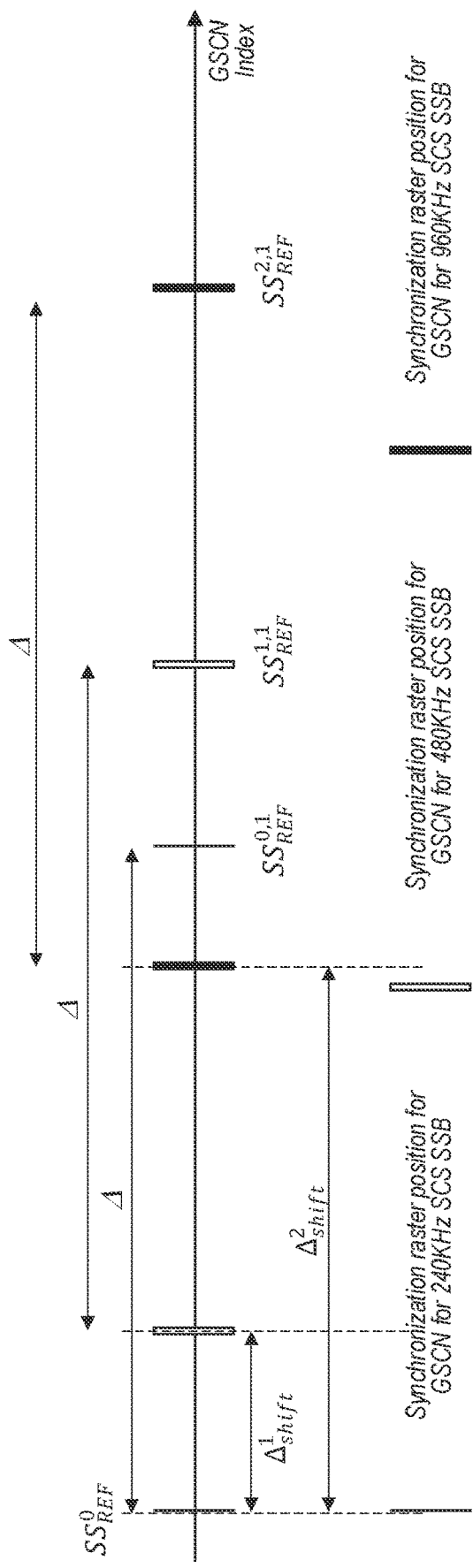
FIG. 11 illustrates an example of offset-based synchronization raster determination for a band with multiple SSB SCSs, according to some embodiments.

FIG. 11—Offset-Based Synchronization Raster Determination for a Band with Multiple SSB SCSs In some embodiments, a single step size $\Delta$ may be used for all SCSs of SSB in addition to different frequency shifting $\Delta_{shift}^i$ or starting positions $S_i$ to determine the $SS_{REF}^i$ for different SSB SCS i. More specifically, in some embodiments the SSB frequency position $SS_{REF}^i$ of GSCN value 'O' (where O>22255) for SCS i may be determined as a common start frequency position characterized by $SS_{REF}^{i,O}=SS_{REF}^0+O^*\Delta+\Delta_{shift}^i$. Additionally or alternatively, the start frequency position for each SCS may be directly defined as $SS_{REF}^i=S_i+O^*\Delta$, according to some embodiments. FIG. 11 illustrates an example of synchronization raster determination for different SSB SCSs using the aforementioned approach to determine the $SS_{REF}^i$ for different SSB SCS i. Additionally, FIG. 11 assumes three SSB SCSs (120 kHz, 480 kHz and 960 kHz respectively) in a frequency band.

More specifically, FIG. 11 illustrates an offset-based synchronization raster determination for a band with multiple SSB SCSs. For example, FIG. 11 displays that a single step size $\Delta$ is used for the assumed three SSB SCSs (120 kHz, 480 kHz and 960 kHz respectively) as shown between $SS_{REF}^0$ and $SS_{REF}^{0.1}$ for the 240 kHz, $SS_{REF}^1$ and $SS_{REF}^{1.1}$ for the 480 kHz, and $SS_{REF}^2$ and $SS_{REF}^{2.1}$ for the 960 kHz. Additionally, the different frequency shifting parameters $\Delta_{shift}^1$ corresponding to the frequency shift between the 240 kHz SCS SSB and the 480 kHz SCS SSB and $\Delta_{shift}^2$ corresponding to the frequency shift between the 240 kHz SCS SSB and the 960 kHz SCS SSB are also illustrated.

FIG. 12—Modified System Information Block 4 (SIB4) Indicating Optional SCSs of SSBs For inter-frequency cell re-selection, the use of optional SSB SCS (i.e., 480 kHz or 960 kHz) may be explicitly provided for each listed carrier by using System Information Block 4 (SIB4), according to some embodiments. Moreover, at least one absolute radio-frequency channel number (ARFCN) or GSCN with mandatory SCS (e.g., 120 kHz SCS) should be included in the frequency list provided by SIB4. FIG. 12 illustrates a modified SIB4 to explicitly provide the optional SSB SCS information for each listed frequency and cell, according to some embodiments. For example, as shown in FIG. 12, a UE may opt to not perform cell re-selection on ARFCN3, ARFCN4, or ARFCN8 if it does not support SCS 960 kHz. Similarly, a UE may opt to not perform cell re-selection on ARFCN1 or ARFCN5 if it does not support SCS 480 kHz.

Additionally, when considering Cell Global Identity (CGI) reading to support an Automatic Neighbor Relation (ANR) function in a frequency band above 52.6 GHz, the optional SCSs of SSB (i.e., 480 kHz or 960 kHz SCS) used for CGI purpose may need to be limited to non-GSCN locations. Moreover, one key condition may involve the frequency position of the SSB with optional SCSs being provided by the ssbFrequency information element (IE) in a measurement configuration associated with a reporting configuration providing the reportCGI IE. Accordingly, this should not correspond to the GSCN of a synchronization raster entry. This restriction to non-GSCN locations may be useful for eliminating the possibility of using these optional SCSs for initial access during cell selection procedure.

In some embodiments, the UE may determine an offset from a smallest resource block (RB) index of the CORESET for Type0-PDCCH CSS set to a smallest RB index of the common RB overlapping with a first RB of the corresponding synchronization signal/physical broadcast channel (SS/PBCH) block according to a sum of two offsets $O_1$ and $O_2$. Furthermore, offset $O_1$ may be signaled by the IE controlResourceSetZero of PBCH payload based on a table hard-encoded in in the UE or specification. Additionally, offset $O_2$ may be determined as the offset from a smallest RB index of the common RB overlapping with the first RB of the SS/PBCH block indicated in the measurement configuration to a smallest RB index of the common RB overlapping with the first RB of a SS/PBCH block hypothetically located at the GSCN of a synchronization raster entry corresponding to the concerned cell configured for CGI reporting.

Figure 13:
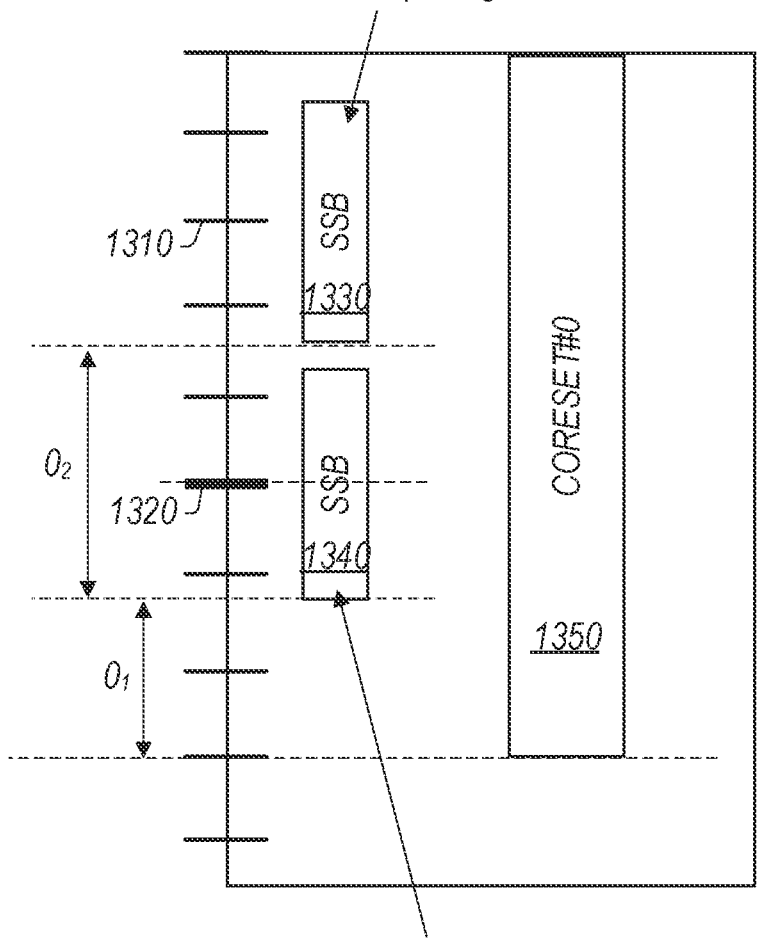
FIG. 13 illustrates an example of SSB transmission to support a CGI reporting function by allowing CORESET #0 and Type0 search space for SIB1 acquisition, according to some embodiments.

FIG. 13—SSB Transmission with Optional SCSs for CGI Reporting

FIG. 13 illustrates one example of SSB 1330 transmission to support a CGI reporting function by allowing CORESET #0 1350 and Type0 search space for SIB1 acquisition, according to some embodiments. For example, by restricting SSB 1330 transmission with optional SCS (480 kHz and 960 kHz SCSs) to a ARFCN 610 that has no valid GSCN mapping (in contrast to ARFCN 1320 which has a valid GSCN mapping), the network (e.g., a base station or gNB) may effectively solve the problem of unnecessary power consumption of optional SCSs SSB detection during cell search for a UE that does not support these optional SCSs.

More specifically, as shown in FIG. 13, a UE may obtain the '$O_1$' value based on the value of IE 'controlResourceSetZero' in SSB 1330. Additionally, in some embodiments, the value of '$O_2$' may be derived by the UE based on the lowest physical resource block (PRB) of SSB 1330 on ARFCN13, which is provided in a CGI measurement configuration. Additionally or alternatively, the value of '$O_2$' may be derived by the UE based on the lowest PRB of hypothetical SSB 1340 on ARFCN 1320 with valid GSCN or on the offset RB between the transmitted SSB and CORESET #0 for SIB1 where the reception is a sum of the '$O_1$' value and '$O_2$' values.

In some embodiments, the modified SCS IE SubcarrierSpacing may also be used to provide information of optional SSB SCS for the target Cell for a UE that reports support of the corresponding optional SC S(s).

Sample IE:
SubcarrierSpacing::=ENUMERATED {kHz15, kHz30, kHz60, kHz120, kHz240, kHz480, kHz960, spare 1}

For example, in a SCell Addition/Modification message, measurement related IEs may include at least: 'MeasIdleCarrierNR-r16', 'MeasObjectNR' and 'MeasTiming' to convey the presence and the exact value of optional SSB SCS information of the listed frequency band as assist information.

Methods for SS/PBCH Blocks Transmission in Wireless Communication

As noted above, new methods related to Initial Access Channels (e.g., SSB transmission) may be desired to enable extension of NR operation up to 71 GHz in the licensed and unlicensed bands. For example, support of up to 64 SSB beams for licensed and unlicensed operation in this frequency range as well as support of 120 kHz SCS for SSB and 120 kHz SCS for initial access related signals/channels in an initial bandwidth part (BWP) have been analyzed. Additionally, support for SCSs (240 kHz, 480 kHz, 960 kHz) for SSBs, and additional SCSs (480 kHz, 960 kHz) for initial access related signals/channels in an initial BWP have also been analyzed in addition to the potential need for additional SCSs (480 kHz, 960 kHz) for SSB for cases other than initial access.

Accordingly, there is a clear need to develop solutions for SSB transmission with larger SCSs (i.e., 480 kHz and 960 kHz SCS) in addition to taking into account the need of DL-UL switching gap to enable UL short control transmission between consecutive SSB transmission. Moreover, the power consumption for cell search needs to be considered as well, which would be degraded with the increased size of larger SCS SSB transmission windows. The embodiments described below seek to provide solutions for assisting the UE such that the UE is able to effectively switch between different beam patterns for candidate SSBs of various SCSs.

FIG. 14—Method of Indicating Beam Switching Between Candidate SSBs

FIG. 14 illustrates a method of indicating beam switching between candidate SSBs, according to some embodiments. The method may be performed by a cellular base station in a cellular network. For example, as briefly mentioned above, cell searching operations can greatly impact the power consumption of a UE, especially in larger SCS transmission windows. Therefore, the method described hereinbelow seeks to provide a mechanism for enabling UL short control transmission between consecutive SSB transmissions through efficient switching between different beam patterns for candidate SSBs of various SCSs.

In 1402 a base station (BS) may transmit a plurality of synchronization signal (SS) blocks according to a periodic pattern. For example, synchronization signal blocks (SSBs) may be transmitted in a pattern such that certain symbols in a slot have the same indexing values each time the SSB is transmitted according to the pattern. In other words, the symbols of the SSB may occupy the same position in the slot each time the SSB is transmitted with the periodic pattern.

Additionally, as part of 1402, in 1402a, the BS may include SS bursts each including SS blocks (SSBs) in a subset of periods of the periodic pattern are transmitted. In other words, the plurality of synchronization signals transmitted by the base station may be transmitted with a certain periodicity corresponding to groups or bursts of one or more SSBs. For example, a first SS burst including three SSBs may be transmitted by the base station followed by (after a certain time period) another SS burst including three more SSBs for measurement by the UE. This burst periodicity may be a subset of the periodic pattern corresponding to the plurality of SSBs being transmitted by the base station.

Next, as part of 1402, in 1402b the BS may include at least one symbol reserved between two consecutive SSBs for beam switching in each SS burst. For example, the synchronization signal blocks (SSBs) may be transmitted in a pattern such that certain symbols in a slot are reserved for beam switching. More specifically, the reserved beam switching symbols of the candidate SSBs may have indexes corresponding to the periodic pattern such that the symbols are arranged in the slot to allow for different transmit beams to be used for two consecutive SSBs. In other words, by providing appropriate spacing between the reserved beam switching symbols (according to the periodic pattern), the UE may be able to more effectively perform beam switching operations between consecutive SSBs.

Figure 15:
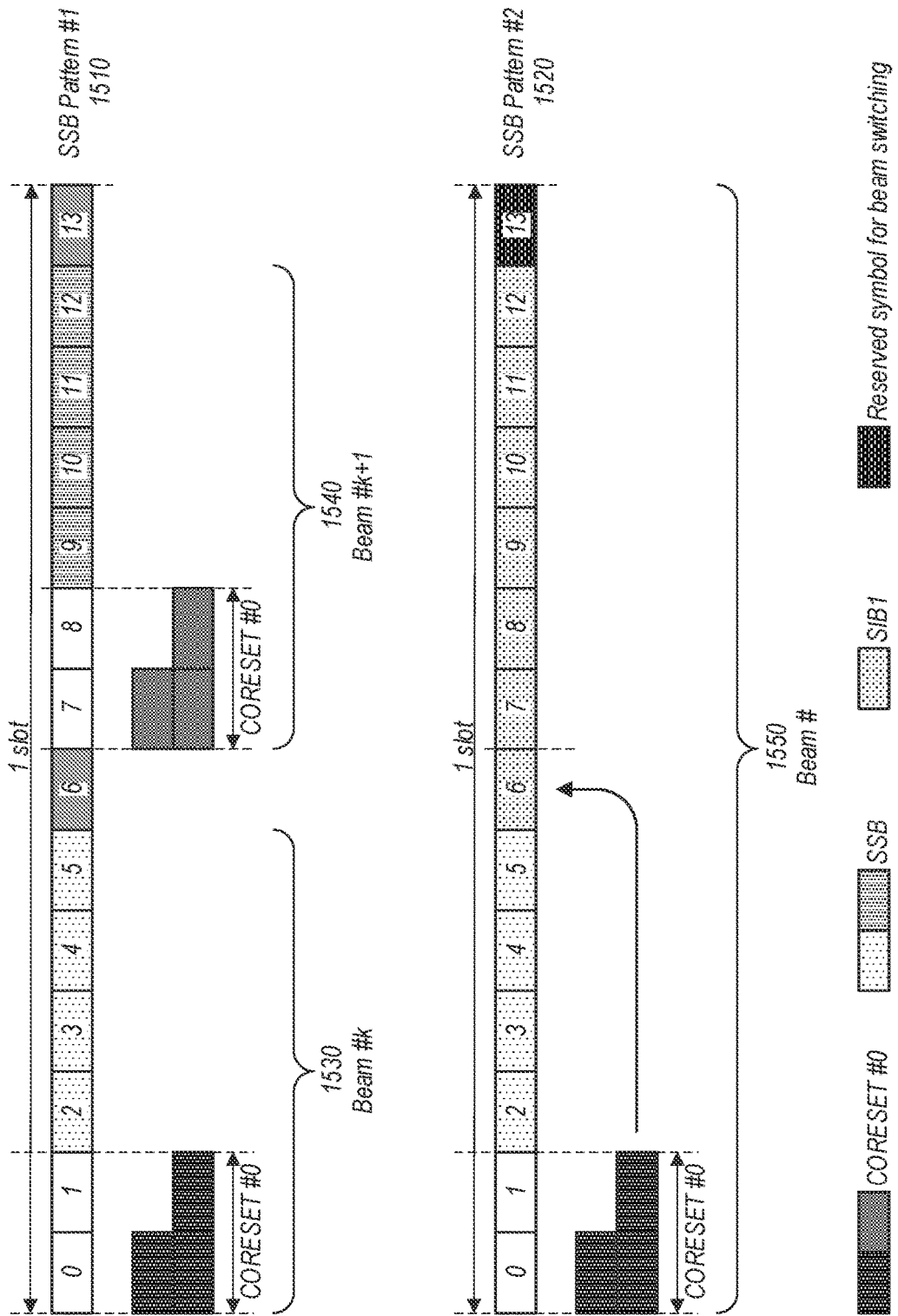
FIG. 15 illustrates candidate SSB patterns for 480 kHz and 960 kHz SCSs with multiplexing between CORESET 0 and the SSB, according to some embodiments.

FIG. 15—Candidate SSB Patterns for 480 kHz and 960 kHz SCSs with Multiplexing Between CORESET 0 and the SSB In some embodiments, a variety of 'symmetric' SS/PBCH block (SSB) patterns may be defined by reserving at least one symbol between two consecutive candidate SSBs for beam switching (e.g., symbol #6 in Pattern 1 and symbol #13 of Patterns #1 and #2 in FIG. 15). For a half frame with SSBs, the first symbol indexes for candidate SSBs may be determined as follows, where index 0 corresponds to the first symbol of the first slot in a half-frame. For example, in regard to Pattern #1 1510 in FIG. 15, the first symbols of the candidate SSB have indexes $\{2,9\}+14*n$, $n=0, 1, 2, \ldots, 31$. With this pattern, two symbols (i.e., symbols #6 and #13) may be reserved in a single slot for SSB beam switching such that different Tx beams #1530 and #1540 can be used for two consecutive SSBs, according to some embodiments.

In regard to Pattern #2 1520 in FIG. 15, the first symbols of the candidate SSB may have indexes $2+14*n$, $n=0, 1, 2, \ldots, 63$. Correspondingly, Pattern #2 may be able to allocate more resources for SIB1 such that the SSB, the associated CORESET 0, and SIB1 message are transmitted using the same analog beam (e.g., beam #1550 in FIG. 15) in a single slot without beam switching, according to some embodiments. Thus by transmitting the above resources on the same beam, one benefit may be that the switching gap overhead is minimized.

A number of approaches may be considered when determining the corresponding SSB pattern from Pattern #1 and Pattern #2 in FIG. 15 if both patterns are supported. For example, in some embodiments, the different patterns maybe hard-encoded in the UE or specification with a one-to-one mapping of different SCSs of SSBs without need of explicit signaling. Furthermore, the SCS of SSB may be assumed to be hard-encoded in 3GPP specification for each allowed GSCN of a synchronization raster entry.

In some embodiments, Pattern #2 may be used for 960 kHz SCS SSB so as to avoid beam switching within a slot given the fact that the slot duration is quite short. On the other hand, Pattern #1 may be applied for 480 kHz SCS, which may advantageous for SSB beam sweeping latency reduction and reducing the UE power consumption and latency for cell search.

Various alternatives may be considered to indicate one of two SSB patterns by using a 1-bit field either in a master information block (MIB) or PBCH payload, according to some embodiments. For example, the reserved 1-bit field 'R' in MIB payload, re-purposing the 1-bit field 'subCarrierSpacingCommon' (assuming the same SCS between CORESET 0/SIB and SSBs may be used to indicate an SSB), and/or re-purposing the 1-bit $a_{A+5}$ in PBCH payload (assuming $u_{SSB} \geq u_{CORESET0}$ for frequencies above the 52.6 GHz frequency band and $k_{SSB} \leq 11$, where $u_{SSB} \geq u_{CORESET0}$ represents numerology of SSB and CORESET 0, respectively) may be utilized to indicate the corresponding SSB pattern, according to some embodiments.

Figure 16:
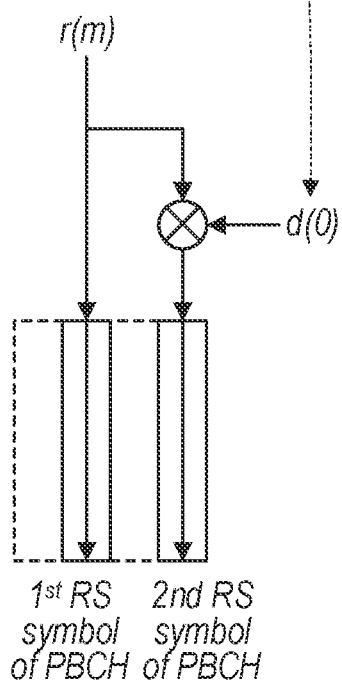
FIG. 16 illustrates a 1-bit SSB pattern index signaled by a 2nd demodulation reference signal (DMRS) symbol of a PBCH transmission, according to some embodiments.

FIG. 16—1-bit SSB Pattern Index Signaled by 2nd DMRS Symbol of PBCH Transmission In some embodiments, the 1-bit SSB pattern index b(0) may be carried by utilizing a scrambling sequence such as [$w_0, w_1, \ldots, w_{23}$] to scramble the CRC bits of PBCH as illustrated in 1610 of FIG. 16. In another approach, the DMRS sequence of 2nd PBCH symbol may be modulated to signal the 1-bit SSB pattern index, according to some embodiments. For example, the DMRS sequence for two PBCH symbols may be generated based on the cell ID ($N_{ID}^{Cell}$) and SSB block index ($i_{SSB}$) and using the equation $c_{init}=2^{11}(\overline{i_{SSB}}+1)([N_{ID}^{Cell}/4]+1)+2^{6}(\overline{i_{SSB}}+1)+(N_{ID}^{Cell} \bmod 4)$. In other words, the DMRS sequence for two different PBCH symbols may be identical.

In some embodiments, the 1-bit SSB pattern index b(0) may be indicated or signal by modulating the 1-bit information element using binary phase shift keying (BPSK) resulting in a single modulation symbol d(0), as shown in 1620 in FIG. 16. Then the modulated symbol d(0) may be used in the generation of the reference symbol for PBCH transmission as illustrated in FIG. 16.

Figure 17:
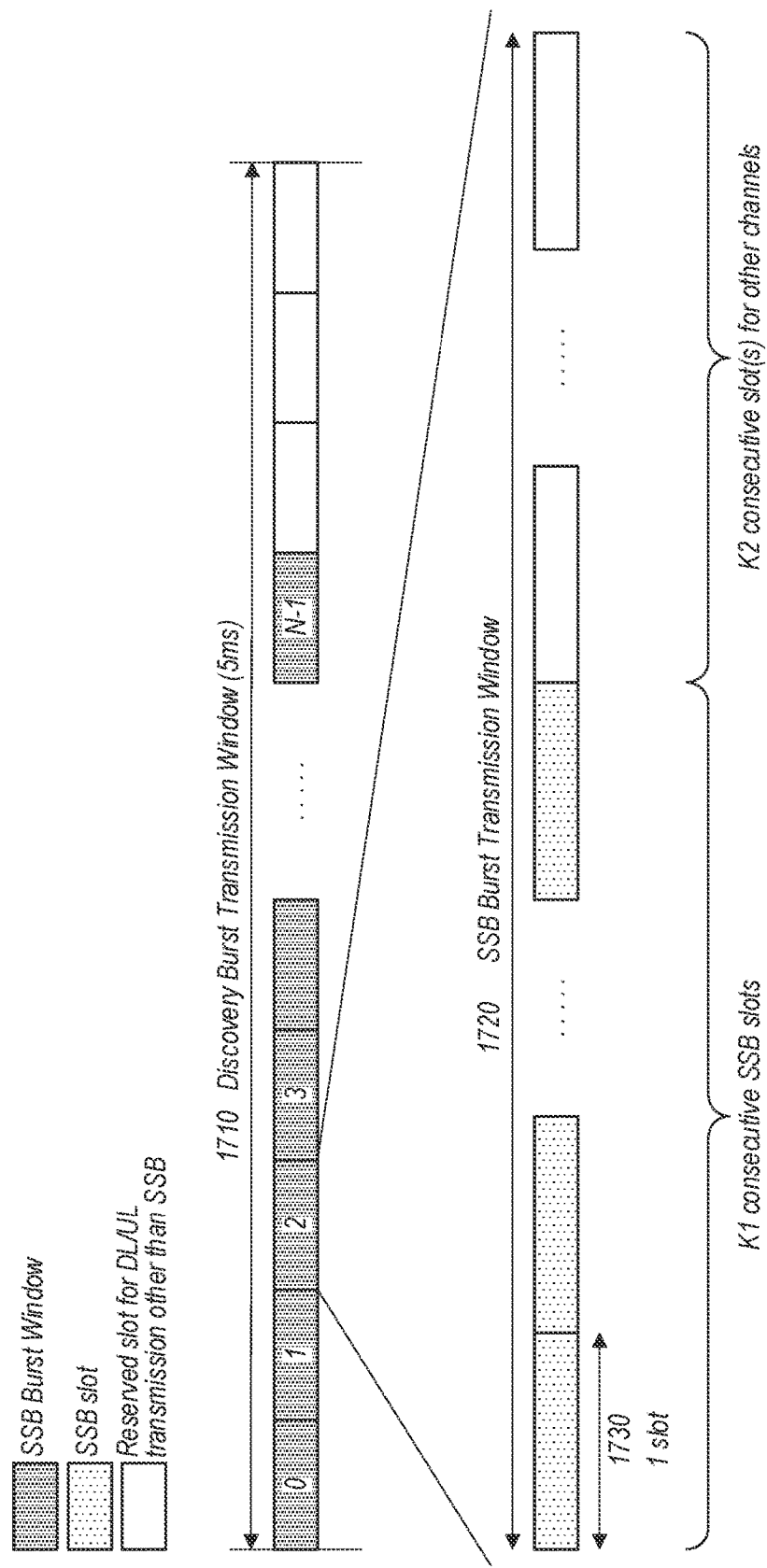
FIG. 17 illustrates an exemplary synchronization signal block transmission window (SSBTW) based SSB pattern in a discovery burst transmission window (DBTW) with uplink (UL) control signaling transmission, according to some embodiments.

FIG. 17—Exemplary SSBTW-Based SSB Pattern in DBTW Window with UL Control Signaling Transmission According to some embodiments, a set of consecutive $N_{slot}$ slots gap may be reserved for UL transmission (e.g., hybrid automatic repeat request-acknowledgement (HARQ-ACK), channel state information (CSI) feedback, or ultra-reliable low-latency communication (URLLC) physical uplink shared channel (PUSCH) scheduling). As illustrated in FIG. 17, the SSB Slot may be shown as a slot consisting of SSB transmissions with either pattern 1 or pattern 2. Furthermore, the SSB Burst Transmission Window (SSBTW) may be shown as window 1710 in FIG. 17 including a first value K1 of consecutive SSB slots and a second value K2 of consecutive slots without SSB transmission. Moreover, the Discovery Burst Transmission Window (DBTW) may be shown as periodic window 1710 in FIG. 17 consisting of consecutive 'N' SSBTW in the first S=N*(K1+K2) slots.

Accordingly, the number of symbols provided by the K2 slot needs to be at least large enough to fit the total of UL to DL switching, DL to UL switch operation, as well as the allowed DL/UL transmission (e.g., physical uplink control channel (PUCCH)). Correspondingly, Pattern 1 in FIG. 17 may be defined using the first symbols of the candidate SSB within a SSBTW with indexes {2,9}+14*n, n=0, 1, 2, ..., K1, where index 0 corresponds to the first symbol of the first slot in a SSBTW. Furthermore, Pattern 2 in FIG. 17 may be defined using the first symbols of the candidate SSB have indexes 2+14*n, n=0, 1, 2, ..., K1, where index 0 corresponds to the first symbol of the first slot in a SSBTW.

Figure 18:
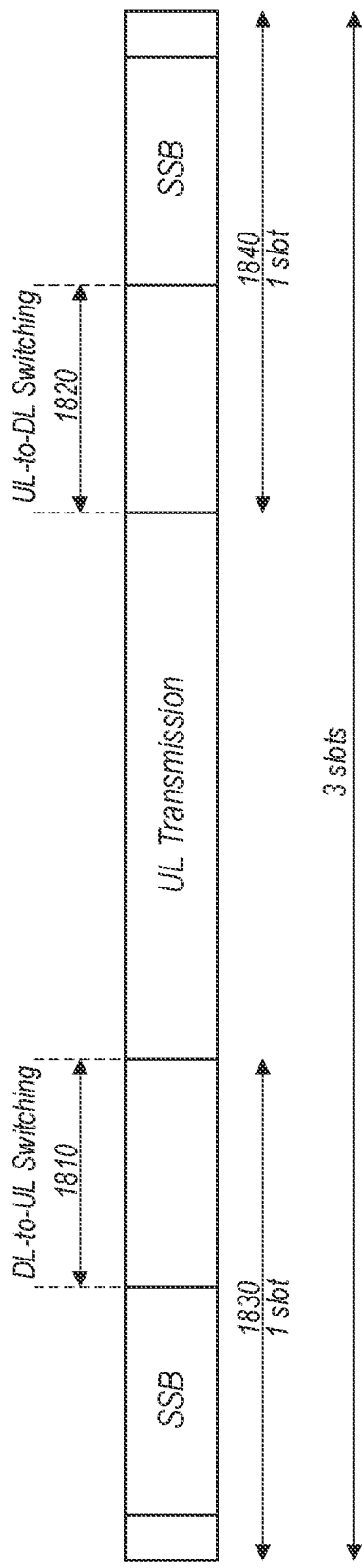
FIG. 18 illustrates an exemplary sub-slot based SSB pattern, according to some embodiments.

FIG. 18—Exemplary Sub-Slot Based SSB Pattern

In some embodiments, SSB patterns maybe introduced to improve the resource efficiency and minimize the power consumption for cell search. For example, as shown in FIG. 18, the last SSB slot 1830 in SSBTWs with an even number may consist of one SSB transmission in the first half slot. Additionally, the first SSB slot 1840 in SSBTWs with an odd number may consist of one SSB transmission (instead of two SSBs as in the other SSB slots in the same SSBTW). In doing so, the UL/DL switching 1810 and 1820 may be performed within the half slot of slot 1830 or 1840 rather than puncturing two slots for the switching operation (assuming the UL/DL switching time value is less than or equal to 7 μs (i.e., a half slot for 960 kHz SCS)).

Accordingly, the values of K1 and K2 slots for SSB transmissions in FIG. 18 maybe defined in a number of ways. For example, the value of K1 and K2 maybe hard-encoded in specification and commonly applied for all of new SCSs (i.e., 480 kHz and 960 kHz SCS), according to some embodiments. Additionally or alternatively, in some embodiments the value of K1 and K2 may depend on the SSB SCS to ensure the gap patterns are aligned in time between different new SCSs. In other words, the K1 and K2 values may scaled up (e.g., multiplied by a numerical factor) to ensure timing alignment between gap patterns corresponding to new SCSs.

FIGS. 19A and 19B—Exemplary Time-Aligned SSBTW for Different New SCSs

FIGS. 19A and 19B illustrate two examples for time-aligned SSBTW patterns for new 480 kHz and 960 kHz SCSs, according to some embodiments. More specifically, FIG. 19A illustrates K2 slots at the end of every 'K1+K2' slots SSBTW being reserved for UL/DL switching and PUCCH/PUSCH transmission. Further shown in FIG. 19A is that <K1, K2> may be hard-encoded as <4, 2> and <8, 4> respectively for 480 kHz and 960 kHz SCS to align the gap slots.

In FIG. 19B, assuming a reference slot (e.g., 120 kHz SCS slot) may be used as a reference to define the SSBTW for larger SCSs, it is illustrated that K1+K2=4 for 480 kHz SCS and K1+K2=8 for 240 kHz SCS. Further shown in FIG. 19B is that <K1, K2> may be hard-encoded as <2, 2> or <4, 4> may be used for 480 kHz and 960 kHz SCS to align the gap slots.

Methods and Apparatus for Discovery Burst Transmission Window Operation in Wireless Communication As noted above, there are numerous studies and work item discussions related to extending current NR operation to 71 GHz. To facilitate NR operations at these high frequencies, it may be desired to modify SSB transmissions in discovery burst transmission windows. In particular, extending operations to the 71 GHz frequency range has introduced the need for specific limitations for transmissions in this extension. For example, in contrast to the 5 GHz and 6 GHz frequency bands, the 52.6 GHz frequency band and above has no limitation on the number of control transmissions but rather has limitations on the total duration of the transmissions within an observation period. More specifically, a margin of up to 10% control frame transmissions without performing an LBT may be allowed within an observation period of 100 ms.

For 480 kHz and 960 kHz SCSs, 64 beams with 20 ms discovery reference signal (DRS) periodicity may count for 2.86% and 1.43% air time, which is less than the 10% margin for short control signaling in a 100 ms observation window. Moreover, when calculating the short control signaling air time, the SS/PBCH symbols may only be counted and orthogonal frequency division multiplexed (OFDM) symbols between SSBs should not be excluded in the calculation, according to some embodiments. Accordingly, one issue becomes apparent with regard to the 120 kHz SCS with 64 SSB and 20 ms periodicity. More specifically, the overhead may be calculated as 0.125*8/14*32*5/100=11.43%, which is over the 10% limitation.

Regarding SSB transmissions above the 52.6 GHz frequency band and particularly for an unlicensed band that requires listen before talk (LBT), it may be desired to support discovery burst (DB) and discovery burst transmission windows (DBTWs) at least for the 120 kHz SSB SCS.

More specifically, if DB is supported, it may be further desirable to determine the signals and channels (other than SS/PBCH blocks) that are included in DB. Moreover, if DBTWs are supported, it may be additionally desirable to incorporate a support mechanism to indicate or inform that DBTW is enabled/disabled for both IDLE and CONNECTED mode UEs. Furthermore, it may be desirable to determine how to support UEs performing initial access that do not have any prior information on DBTW. Additionally, if DBTWs are supported, the PBCH payload size may be less than or equal to the payload size specified for FR2, the duration of the DBTW may be less than or equal to 5 ms, and the number of PBCH DMRS sequences may be the same as in FR2.

Accordingly, embodiments described herein relate to a mechanism for enabling and/or disabling DBTW efficiently and providing assist information about the presence of DBTW prior to initial access. The embodiments described below seek to provide solutions for assisting the UE such that the UE is able to effectively determine and act accordingly regarding the presence of a DBTW. Additionally, the embodiments described below seek to provide solutions for assisting the UE via a mechanism for indicating candidate SSB indices and quasi-colocated (QCL) relation without exceeding the aforementioned limit on PBCH payload size.

FIG. 20—Method of Indicating DPTW Presence in Candidate SCSs

FIG. 20 illustrates a method of indicating DPTW presence in candidate SCSs, according to some embodiments.

For example, in 2002 a base station (BS) may transmit a plurality of synchronization signal blocks (SSBs) to one or more user equipments (UEs). More specifically, the synchronization signals may indicate one or more aspects of cell detection/access, such as timing synchronization (e.g., symbol, time slot, subframe, and/or radio frame level timing) for the cell. Accordingly, the UE may receive and measure these SSBs in an attempt to determine if it any operational or configuration changes need to be made to support additional communications with the network according to the transmitting cell's indicated parameters.

As part of 2002, in 2002a, the BS may include values in the SSBs or PBCH payload indicating the presence of a discovery burst transmission window (DBTW). For example, the transmission may include information or values corresponding to GSCN indices which in turn may correspond to the existence or non-existence of a DBTW. Additionally or alternatively, the transmission from the BS may include information included as modified bit fields, DMRS symbols, or SIB4 symbols among other various elements to indicate the presence or absence of a DBTW. In other words, the BS may explicitly attempt to inform the UE of the presence of a DBTW so as to allow the UE to take appropriate action in response to receiving this indication.

Next, in 2004 the BS may transmit additional SSBs in the DBTW. In other words, based on the information received from the BS indicating the presence of a DBTW, the UE may configure its future transmissions to support said DBTW and possibly attempt to communicate with the network (e.g., a base station) by performing a cell attaching procedure.

Figure 21:
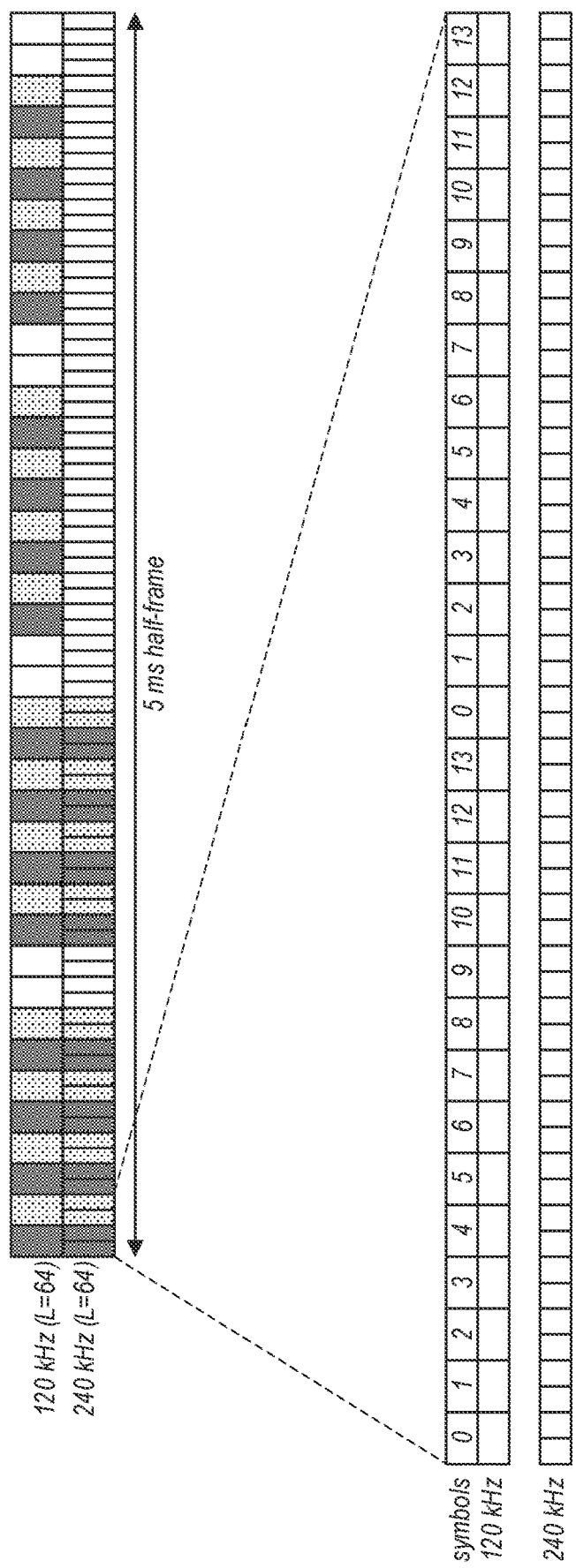
FIG. 21 illustrates examples of 120 kHz and 240 kHz subcarrier spacings in a 5 ms half-frame as well as the SSB starting positions in an expanded portion of 2 slots in the 5 ms half-frame, according to some embodiments.

FIG. 21—120 kHz and 240 kHz SCS

In NR, 120 kHz and 240 kHz SSB may be specified as having a total maximum of 64 SSB per SSB burst. Additionally, in regard to 120 kHz subcarrier spacing, the starting position of each SSB may be defined as $\{4,8,16,20\}+28n$, where n=0, 1, 2, 3, 5, 6, 7, 8, 10, 11, 12, 13, 15, 16, 17, 18. Similarly, for 240 kHz subcarrier spacing, the starting position of each SSB may be defined as $\{8, 12, 16, 20, 32, 36,$ $40, 44\}+56n$, n=0, 1, 2, 3, 5, 6, 7, 8. FIG. 21 illustrates examples of 120 kHz and 240 kHz subcarrier spacings in a 5 ms half-frame as well as the SSB starting positions in an expanded portion of 2 slots in the 5 ms half-frame containing their corresponding CORESET #0, SSB, SIB1, and beam switching symbols, according to some embodiments.

In some embodiments, the potential presence of DBTW may be hard-encoded in specification on a per band basis or mechanisms may be used to provide prior knowledge of discovery burst transmission window (DBTW) presence for a given frequency. In other words, the provided prior knowledge of the DBTW may only apply to a given band that indicates the potential presence of DBTW due to regional LBT regulatory requirement.

Figure 22:
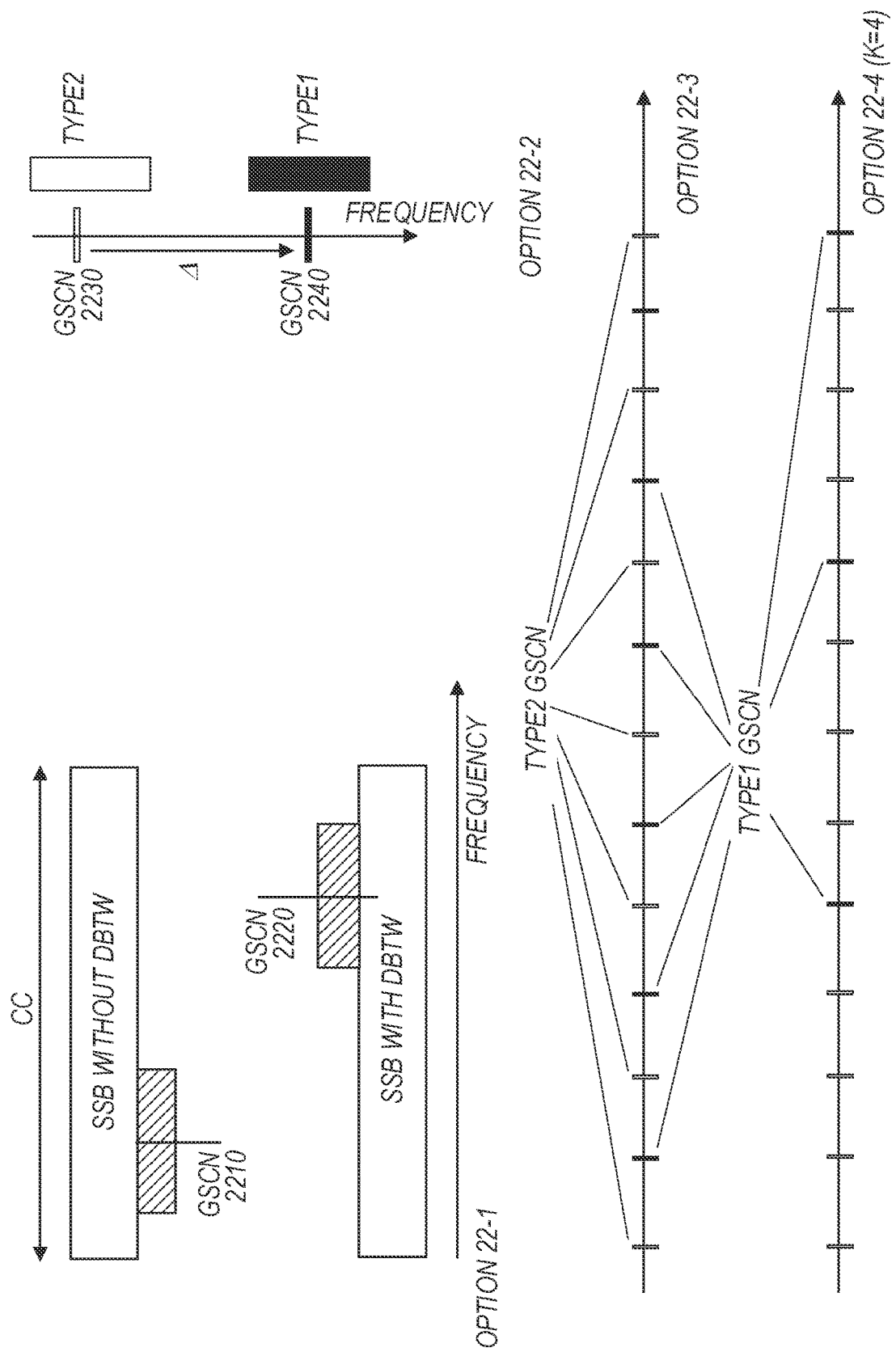
FIG. 22 illustrates DBTW presence indication based on pre-allocation of GSCN values, according to some embodiments.

FIG. 22—DBTW Presence Indication Based on Pre-Allocation of GSCN Values

In some embodiments, the mechanism for indicating the presence of a DBTW may be GSCN based. For example, different synchronization raster values (i.e., Global Synchronization Channel Numbers (GSCNs)) may be defined and associated with different DBTW configurations. In some embodiments, two GSCNs may be reserved for a component carrier (CC) as shown in FIG. 22. As illustrated, the first GSCN 2210 may be used for SSB transmission with DBTW while the second GSCN 2220 may used for SSB transmission without DBTW. Accordingly, DBTW may be assumed respectively when a UE performs cell searches on the corresponding GSCN value.

Additionally or alternatively, the GSCN(s) with DBTW (shown as Type 1 GSCN in FIG. 22) may be determined by an offset value $\Delta$ relative to GSCN without DBTW (shown as Type 2 GSCN in FIG. 22), according to some embodiments. For example, a single offset value may be hard-encoded in specification for a particular frequency range and/or different offset values may be defined for each frequency band within a frequency range.

In some embodiments involving multiple GSCNs for a band, the GSCN(s) with an even number may be used for Type 1 GSCN to indicate the presence of DBTW and odd GSCN numbers may be reserved for Type 2 GSCN to transmit SSB without DBTW.

Additionally or alternatively, a step size $\Delta_2$ of Type 2 GSCN may be compared to a relatively larger GSCN step size $\Delta_1$ which may correspond to a Type 1 GSCN wherein $\Delta_1$ may be defined as $\Delta_1=K^*\Delta_1$, $K\geq1$ as an integral number.

FIG. 22 illustrates at least some of the aforementioned embodiments. For example, as shown in FIG. 22 with respect to as Option 22-1, GSCN 2210 and 2220 may be predefined in specification to associate with different configurations (e.g., with or without DBTW), according to some embodiments. Additionally or alternatively, instead of indicating GSCN 2240 for Type 1, Option 22-3 illustrates the derivation of the Type 1 GSCN by the UE based on a predefined value relative to the Type 2 GSCN 2230 in the same CC.

Furthermore, in some embodiments relating to Option 22-3 illustrated in FIG. 22, the Types 1 and/or 2 GSCN may be already known at the UE side based on even or odd GSCN values as previously described. Additionally or alternatively, FIG. 22 illustrates Option 22-4 wherein the step size of Type 1 GSCN is K times of that of Type 2 GSCN and hard-encoded in specification.

FIG. 23—DBTW Presence Indication by Re-Purposing Existing Fields of PBCH Payload FIG. 23 illustrates an example method of re-purposing existing fields in PBCH payloads as a means of indicating DBTW presence, according to some embodiments. For example, the reserved bit field 'R' in a MIB may used to indicate the presence of DBTW for the corresponding frequency band. More specifically, when the R field is set to '0', it may indicate the UE to disable DBTW and if the R field is set to '1' it may indicate to the UE to enable DBTW, according to some embodiments.

In some embodiments, the same SCS may be used for SSB and associated CORESET0. Accordingly, with the same restriction, the 1-bit 'subCarrierSpacingCommon' field in the PBCH payload may be re-purposed to indicate the presence of DBTW using '0' and '1' to indicate disable/enable DBTW, respectively.

Figure 24:
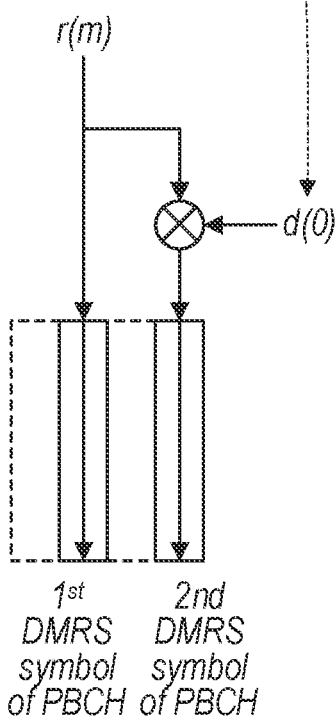
FIG. 24 illustrates the use of the 2nd DMRS symbol of a PBCH transmission in order to indicate the presence of DBTW, according to some embodiments.

Similarly, by restricting the same SCS between SSB and associated CORESET0, the 1-bit least significant bit (LSB) of 'ssb-SubcarrierOffset'(i.e., $k_{SSB}$) may be re-purposed to indicate the presence of DBTW by means of the '0' and '1' values, according to some embodiments. Moreover, the frequency domain offset between the SSB and the overall resource block grid may be limited to an even number (i.e., 0, 2, 4, . . . , 14) by using the three most significant bits (MSBs) of 'ssb-SubcarrierOffset' as also illustrated in FIG. 24.

In some embodiments, the 1-bit MSB of 'controlResourceSetZero' in 'pdcch-ConfigSIB1' may be re-purposed to indicate the presence of DBTW given the fact that only eight items were used for {SSB, PDCCH}={120,120} kHz configuration. Additionally or alternatively, one of three MSBs of 'searchSpaceZero' in 'pdcch-ConfigSIB1' may be used to indicate the presence of DBTW given the condition that Pattern-3 is used for SSB and CORESET #0 multiplexing.

Additionally or alternatively, the 1-bit 'dmrs-TypeA-Position' may also be re-purposed assuming a fixed value (i.e. pos2 or pos3) which may be hard-encoded in specification for this frequency range, according to some embodiments. Pos2 may be sufficient for PDCCH transmission due to the fact that LTE is not utilized in this frequency range as it is a heavily beam-formed system. The sample code block below illustrates at least some of the embodiments described above in regard to re-purposing existing fields in PBCH payloads.

| Example code block: |
| --- |
| MIB:: = SEQUENCE { <br> SystemFrameNumber BIT STRING (SIZE (6)), <br> subCarrierSpacingCommonENUMERATED {scs15or60, scs30or120}, <br> ssb-SubcarrierOffset   INTEGER (0..15), <br> dmrs-TypeA-Position ENUMERATED {pos2, pos3}, <br> pdcch-ConfigSIB1   PDCCH-ConfigSIB1 <br> cellBarred   ENUMERATED {barred, notBarred}, <br> intraFreqReselection   ENUMERATED {allowed, notAllowed}, <br> DBTW       ENUMERATED {enabled} <br> } <br> PDCCH-ConfigSIB1::= SEQUENCE { <br> controlResourceSetZero   ControlResourceSetZero, <br> searchSpaceZero   SearchSpaceZero <br> } |

FIG. 24—DBTW Presence Signaled Using $2^{nd}$ DMRS Symbol of PBCH Transmission

FIG. 24 illustrates the use of the $2^{nd}$ DMRS symbol of a PBCH transmission in order to indicate the presence of DBTW, according to some embodiments. For example, the 1-bit DBTW presence information b(0) may be carried by utilizing a scrambling sequence such as [$w_0$, $w_1$, . . . , $w_{23}$] to scramble the CRC bits of PBCH as illustrated in 2410 of FIG. 24. In another approach, the DMRS sequence of the 2nd PBCH symbol may be modulated, according to some embodiments. For example, the DMRS sequence for two PBCH symbols may be generated based on the cell ID ($N_{ID}^{Cell}$) and SSB block index ($i_{SSB}$) and using the equation $c_{init}=2^{11}(\overline{i_{SSB}}+1)([N_{ID}^{Cell}/4]+1)+2^6(\overline{i_{SSB}}+1)+(N_{ID}^{Cell} \bmod 4)$. In other words, the DMRS sequence for two different PBCH symbols may be identical.

In some embodiments, the 1-bit DBTW presence information b(0) may be indicated or signal by modulating the information bit resulting in a single modulation symbol d(0), as shown in 2420 in FIG. 24. Then the modulated symbol d(0) may be used in the generation of the reference symbol for PBCH transmission as illustrated in FIG. 24.

FIG. 25—DBTW Presence and Associated Q Value in an ARFCN Indicated by SIB4

Figure 26:
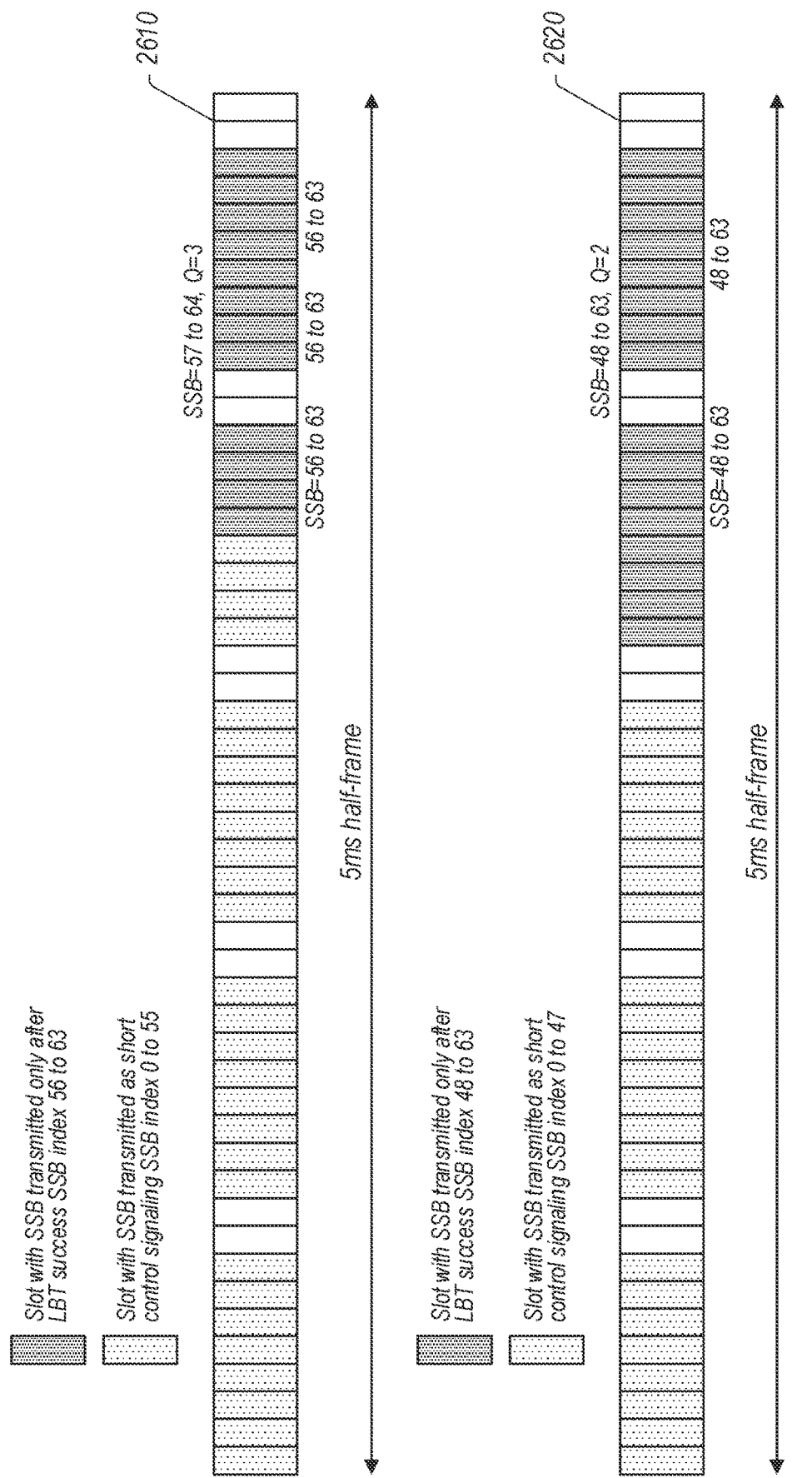
FIG. 26 illustrates an example of SSBs with fixed locations within the 5 ms discovery reference signal (DRS) window, according to some embodiments.

FIG. 25 illustrates the presence of DBTW and an associated Q value in a number of ARFCNs as indicated by SIB4, according to some embodiments. In other words, the information about the presence of DBTW and the value of Q (if DBTW is enabled) may be provided in different higher-layer signals. For example, for inter-frequency cell re-selection, the presence of DBTW and the corresponding Q value may be explicitly provided for each listed carrier by using System Information Block 4 (SIB4). FIG. 25 illustrates one example of SIB4 configuration to provide explicit DBTW presence information such as DBTW being enabled and specific Q values, according to some embodiments. More specifically, 2520 of FIG. 26 shows DBTW being enabled on AFRCN #1, #2, and #3 with Q values of 2, 4, and 8 respectively.

Furthermore, for SCell addition and/or modification, the presence of DBTW for each SCell may be included in the sCellToAddModList and the Q value (if DBTW is enabled) may be separately provided in the sCellConfigCommon and sCellConfigDedicated IEs for SCell or SCG.

In some embodiments involving radio resource management (RRM) measurement of a neighbor cell in IDLE, INACTIVE and CONNECTED states, DBTW presence and a corresponding Q value may be broadcasted in SIB (e.g., SIB2 for intra-frequency neighbor cells and SIB3 for intra-frequency cell re-selection) and/or dedicated RRC signaling measObjectNR for the serving cell.

Moreover, in some embodiments, a common Q value may be signaled from the serving cell for a listed neighboring cell which may override the value signaled by the SIB message. Additionally, the DBTW window may be assumed to be present during initial access procedure, unless it is disabled by a base station (e.g., gNB) through broadcast SIB information or dedicated radio resource control (RRC) signaling after initial access. Furthermore, this information regarding whether DBTW is enabled or disabled may be stored as part of the cell information and then leveraged in the UE's cell selection procedure, according to some embodiments.

Candidate SSB Indices and QCL Relations

In some embodiments, the parameter 'Q' may be used to indicate the quasi-colocated (QCL) relationship between candidatesSSB positions on the frequency indicated by ssbFrequency for operations with shared spectrum channel access. For example, a set of integral values may be hard-encoded in specification for Q signaling such as <32,64>. Additionally or alternatively, a fractional value maybe introduced to support finer granularity of DL SSB beam numbers, according to some embodiments.

In regard to indicating the quasi-colocated (QCL) relationship between candidatesSSB positions on the frequency indicated by ssbFrequency, re-purposing existing fields in PBCH payload may provide a mechanism for indicating said relationship with the parameter 'Q'. Furthermore, in some embodiments, more than one existing field in a PBCH payload of DBTW signaling maybe re-purposed if the candidates Q values are larger than 2. For example, the 1-bit 'subCarrierSpacingCommon' field and 1-bit LSB of ssb-SubCarrierOffset may be jointly used to indicate 2-bits Q values, according to some embodiments.

Moreover, a scrambling sequence such as [$w_0, w_1, \ldots, w_{23}$] may be utilized to scramble the CRC bits of PBCH as illustrated in 2410 of FIG. 24. Furthermore, in the case of 2-bits, two additional scrambling sequences maybe defined in addition to the sequences defined in 2410 of FIG. 24.

Additionally or alternatively, the DMRS sequence of the 2nd PBCH symbol may be modulated based on the Q value, according to some embodiments. Furthermore, in the example of the previously mentioned 2-bits Q values, QPSK modulation rather than BPSK modulation may be used for d(0) as shown in 2420 in FIG. 24.

In some embodiments, the duration of the DBTW may be less than or equal to 5 ms. Accordingly, the maximum number of candidates SSBs within a DMTW may be defined as $\overline{L_{max}}$, where $\overline{L_{max}}$=80 for 120 kHz SSB SCS.

A variety of approaches may be utilized to determine the candidate SSBs that are quasi co-located with respect to average gain and quasi co-location 'typeA' and 'typeD' properties (referred to as QCLed candidate SSBs hereinafter). For example, within a DBTW, a combination of $L_1$ SSBs used as short control signaling without LBT and $L_2$ SSB transmission with LBT operation may be assumed at UE side, according to some embodiments.

In one embodiment, $L_1$=56, which accounts for 0.125*8/14*28=2 ms, which further accounts for 10% of 100 ms observation period assuming a 20 ms SSB periodicity. Accordingly, the relation $$Q = \frac{16}{L_{2+1}}$$

may need to be met for the paired Q value and $L_2$ to support L=$L_1$+$L_2$ DL physical beams. Correspondingly, the value of Q may be signaled and may also indicate the pair of <$L_1, L_2$, Q> values such as <$L_1$=48, $L_2$=16, Q=2> or <$L_1$=56, $L_2$=8, Q=3> so as to support up to L=64 physical beams, as demonstrated in FIG. 26.

In some embodiments, the pair<$L_1, L_2$, Q> values maybe hard-encoded in specification and the UE may derive the <$L_1, L_2$> values once it has obtained the Q value signaled by the base station (e.g., gNB).

For example, as shown by 2610 of FIG. 26, $L_1$=56 SSBs have fixed locations within the 5 ms DRS window and remain under the short control signaling rule corresponding to $L_2$=8 SSB with Q=3, and. Additionally, as shown by 2620 of FIG. 26, $L_1$=48 SSBs have fixed locations within the 5 ms DRS window and remain under the short control signaling rule corresponding to $L_2$=16 SSB with Q=2.

In some embodiments, the DB may include a set of signals and/or channels confined within a DBTW and associated with a duty cycle. For example, the DB may include SSB, CORESET #0 that schedules SIB1 physical downlink control channel (PDCCH), SIB1 PDSCH and/or non-zero power channel state information resource set (NZP-CSI-RS). However, the base station (e.g., gNB) scheduler may decide to select channels/signals without LBT operation. In other words, the base station may apply the short control signal exemption corresponding to the restriction of 10% control frame transmissions without performing an LBT being fulfilled within an observation period of 100 ms.

Furthermore, the candidate SS/PBCH blocks in a half frame may be indexed as 'L' in an ascending order in time from 0 to $\overline{L_{max}}$-1, $\overline{L_{max}}$=80 and a UE may assume or have knowledge that SS/PBCH blocks in a serving cell that are within a same DBTW or across DBTWs are quasi co-located QCLed candidate SSBs.

For example, as a first option, a value of (L mod Q) may be the same among the SS/PBCH blocks and therefore said SS/PBCH blocks may be quasi co-located QCLed candidate SSBs, according to some embodiments. Additionally or alternatively as a second option, if a value of $$\left(L \bmod \left(\frac{\overline{L_{max}}}{Q}\right)\right)$$

is same among the SS/PBCH blocks, said SS/PBCH blocks may be quasi co-located QCLed candidate SSBs.

Furthermore, the physical meaning of the 'Q' parameters may be fundamentally different for the first and second options described above. For example, in the first option the value of Q may be equal to the number of physical beams (e.g., <56,64>) while in the second option the value of Q may define the number of repetition numbers for a given DL beam.

Figure 27:
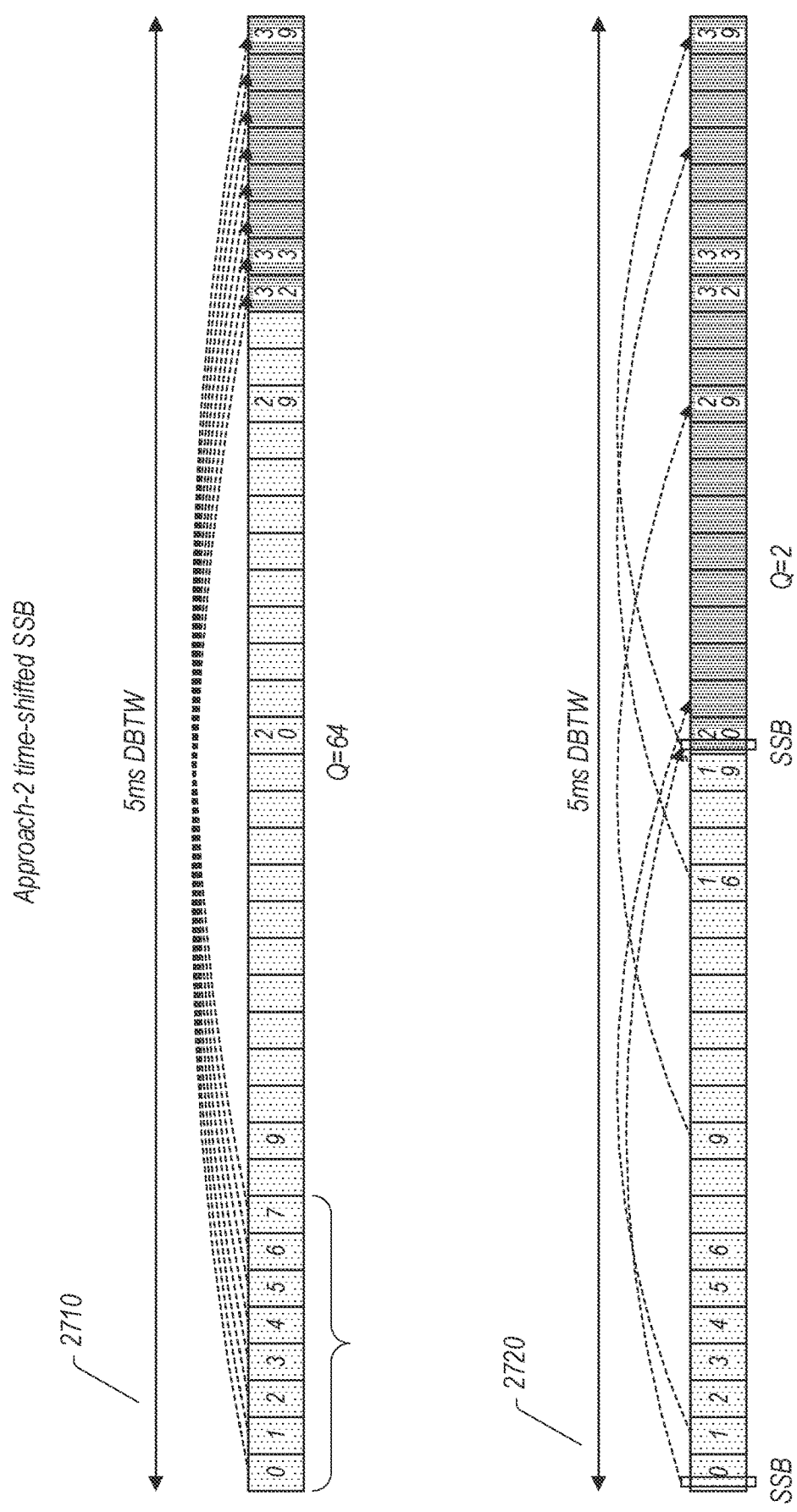
FIG. 27 illustrates an example of time-shifted SSB transmission within a 5 ms DBTW window, according to some embodiments.

FIG. 27—Time-shifted SSB Transmissions for Frequency Range (FR) 3

FIG. 27 illustrates an example of time-shifted SSB transmission within a 5 ms DBTW window, according to some embodiments. For example, as shown in FIG. 27, each block may consist of two SSB blocks for a total of 80 candidates SSBs within a 5 ms DBTW window within 40 blocks indexing from 0 to 39. In regard to the option 2710, it may be assumed that Q=64 was signaled by the network (e.g., a base station or gNB). Correspondingly, the first candidate SSB index 0~15 may have QCLed SSB candidates with indexes 64~79.

Additionally or alternatively in option 2720, it may be assumed that Q=2 was signaled by the network or base station. Correspondingly, the first candidate SSBs index 0~39 have QCLed SSB candidates with indexes 40~79.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a UE may be configured to monitor a downlink frequency position to detect a synchronization block (SSB) from a cellular base station, wherein in monitoring the downlink frequency position the wireless device may be configured to use at least one step size in calculating a SSB frequency position. Additionally or alternatively, the UE may be further configured to determine, in response to monitoring the downlink frequency position, a subcarrier spacing used by the cellular base station for one or more SSB transmissions, wherein the subcarrier spacing of the one or more SSB transmissions may be determined based at least in part on the at least one step size used in calculating the SSB frequency position. According to some embodiments, the UE may be further configured to utilize the determined subcarrier spacing of the one or more SSB transmissions in communicating with the cellular base station. Additionally or alternatively, in monitoring the downlink frequency position the UE may be configured to calculate a frequency position based on a single step size for all possible SSB subcarrier spacings. According to some embodiments, in monitoring the downlink frequency position the UE may be configured to calculate a frequency position based on a different frequency shift value and/or a different starting position with the single step size in determining a synchronization signal reference for different SSB subcarrier spacings.

What is claimed is:

1. A processor, comprising:
memory storing instructions that, when executed, cause the processor to:
receive, from a cellular base station, synchronization signaling (SS) according to a first pattern, wherein, a plurality of SS blocks (SSBs) are received according to the first pattern wherein, for the first pattern, first symbol indexes for candidate SSBs are according to the equation $\{2,9\}+14*n$, $n=0,1,2, \ldots 31$ for SSBs with a subcarrier spacing of 480 kHz or 960 kHz, wherein the SS comprises a first parameter Q used to indicate a quasi co-location (QCL) relationship between candidate SSB positions on a frequency indicated by a frequency of the SSBs for operation with shared spectrum channel access, wherein a set of integral values are hard-encoded in a specification for Q signaling, and wherein the set corresponds to <32,64>.

2. The processor of claim 1,
wherein for a half frame within one or more of the plurality of SSBs, a second pattern's first symbol includes indexes for candidate SSBs according to the equation $2+14*n, n=0,1,2, \ldots, 63$.

3. The processor of claim 1,
wherein the each of one or more SS bursts, each comprising one or more SSBs of the plurality of SSBs, comprises two symbols reserved in a single slot for SSB beam switching such that different transmit beams are useable for two consecutive SSBs.

4. The processor of claim 1,
wherein the the first pattern provides additional resources for System Information Block 1 (SIB1) such that the SS block, an associated CORESET 0 and SIB1 message is transmittable using a same analog beam in a single slot without beam switching.

5. The processor of claim 1,
wherein the instructions are further executable to cause the processor to:
receive, from the cellular base station, signaling to indicate one of a plurality of SSB patterns.

6. The processor of claim 1,
wherein the instructions are further executable to cause the processor to:
receive a plurality of consecutive SSB Burst Transmission Windows, wherein each SSB Burst Transmission Window comprises a number K1 of consecutive SSB slots followed by a number K2 of consecutive slots reserved for other uplink and/or downlink transmissions.

7. A method, comprising:
transmitting synchronization signaling (SS) according to a first pattern, wherein, a plurality of SS blocks (SSBs) are transmitted according to the first pattern wherein, for the first pattern, first symbol indexes for candidate SSBs are according to the equation $\{2,9\}+14*n$, $n=0, 1,2, \ldots 31$ for SSBs with a subcarrier spacing of 480 kHz or 960 kHz, wherein the SS comprises a first parameter Q used to indicate a quasi co-location (QCL) relationship between candidate SSB positions on a frequency indicated by a second parameter ssbFrequency for operation with shared spectrum channel access, wherein a set of integral values are hard-encoded in a specification for Q signaling, and wherein the set corresponds to <32,64>.

8. The method of claim 7,
wherein for a half frame within one or more of the plurality of SSBs a second periodic pattern's first symbol includes indexes for candidate SSBs according to the equation $2+14*n$, $n=0, 1, 2, \ldots, 63$.

9. The method of claim 7,
wherein each of the one or more SS bursts, each comprising one or more SSBs of the plurality of SSBs, comprises two symbols reserved in a single slot for SSB beam switching such that different transmit beams are useable for two consecutive SSBs.

10. The method of claim 7,
wherein the first pattern provides additional resources for System Information Block 1 (SIB1) such that the SS block, an associated CORESET 0 and SIB 1 message is transmittable using a same analog beam in a single slot without beam switching.

11. The method of claim 7, further comprising:
using one or more of a plurality of SSB patterns, wherein each of the patterns is defined in a cellular communication specification and has a one-to-one mapping with different subcarrier spacings of SSBs.

12. The apparatus of claim 7, further comprising:
using one or more of a plurality of SSB patterns and providing signaling to a user equipment (UE) to indicate one of the plurality of SSB patterns.

13. The method of claim 12,
wherein the signaling comprises a reserved 1-bit field "R" in a master information block (MIB) payload to indicate a respective SSB pattern.

14. The method of claim 12,
wherein the signaling comprises re-purposing a subCarrierSpacing Common field to indicate a respective SSB pattern.

15. A method, comprising:
receiving, from a cellular base station, synchronization signaling (SS) according to a first pattern, wherein, a plurality of SS blocks (SSBs) are received according to the first pattern wherein, for the first pattern, first symbol indexes for candidate SSBs are according to the equation $\{2,9\}+14*n$, $n=0, 1, 2, \ldots 31$ for SSBs with a subcarrier spacing of 480 kHz or 960 kHz, wherein the SS comprises a first parameter Q used to indicate a quasi co-location (QCL) relationship between candidate SSB positions on a frequency indicated by a frequency of the SSBs for operation with shared spectrum channel access, wherein a set of integral values are hard-encoded in a specification for Q signaling, and wherein the set corresponds to <32,64>.

16. The method of claim 15,
wherein for a half frame within one or more of the plurality of SSBs, a second pattern's first symbol includes indexes for candidate SSBs according to the equation $2+14*n$, $n=0, 1, 2 \ldots ,63$.

17. The method of claim 15,
wherein
each of one or more SS bursts, each comprising one or more SSBs of the plurality of SSBs, comprises two symbols reserved in a single slot for SSB beam switching such that different transmit beams are useable for two consecutive SSBs.

18. The method of claim 15,
wherein the first pattern provides additional resources for System Information Block 1 (SIB1) such that the SS block, an associated CORESET 0 and SIB 1 message is transmittable using a same analog beam in a single slot without beam switching.

19. The method of claim 15, further comprising:
receiving, from the cellular base station, signaling to indicate one of a plurality of SSB patterns.

20. The method of claim 15, further comprising:
receiving a plurality of consecutive SSB Burst Transmission Windows, wherein each SSB Burst Transmission Window comprises a number K1 of consecutive SSB slots followed by a number K2 of consecutive slots reserved for other uplink and/or downlink transmissions.

* * * * *